(12) United States Patent
Takizawa

(10) Patent No.: US 7,461,559 B2
(45) Date of Patent: Dec. 9, 2008

(54) ELECTROMECHANICAL TRANSDUCER AND METHOD OF FABRICATING THE SAME

(75) Inventor: Toru Takizawa, Tokyo (JP)

(73) Assignee: Citizen Holdings Co., Ltd., Tokyo (JP)

( * ) Notice: Subject to any disclaimer, the term of this patent is extended or adjusted under 35 U.S.C. 154(b) by 135 days.

(21) Appl. No.: 11/376,435

(22) Filed: Mar. 16, 2006

(65) Prior Publication Data

US 2006/0219025 A1 Oct. 5, 2006

(30) Foreign Application Priority Data

Mar. 18, 2005 (JP) .............................. 2005-079403

(51) Int. Cl.
  *G01B 7/16* (2006.01)
(52) U.S. Cl. .............. 73/777; 73/716; 73/720
(58) Field of Classification Search ................ 73/777, 73/716, 720
  See application file for complete search history.

(56) References Cited

U.S. PATENT DOCUMENTS

| | | | | |
|---|---|---|---|---|
| 6,426,620 | B1 * | 7/2002 | Taguchi et al. | ......... 324/207.21 |
| 6,448,624 | B1 * | 9/2002 | Ishio et al. | ................. 257/417 |
| 6,703,132 | B1 | 3/2004 | Yasuda et al. | |
| 6,732,583 | B1 | 5/2004 | Yasuda et al. | |
| 6,763,716 | B2 * | 7/2004 | Nagahara et al. | ............... 73/493 |
| 6,892,577 | B2 * | 5/2005 | Nagahara | ................. 73/514.32 |
| 6,958,529 | B2 * | 10/2005 | Ishibashi et al. | ............. 257/678 |
| 2001/0040262 | A1 * | 11/2001 | Uchida et al. | ................ 257/415 |
| 2003/0155622 | A1 * | 8/2003 | Ishibashi et al. | ............. 257/414 |
| 2003/0159513 | A1 * | 8/2003 | Nagahara et al. | ......... 73/514.16 |
| 2004/0016981 | A1 * | 1/2004 | Yoshida et al. | ............... 257/414 |
| 2004/0163472 | A1 * | 8/2004 | Nagahara | ...................... 73/593 |
| 2007/0028687 | A1 * | 2/2007 | Hatano et al. | ............. 73/514.01 |

FOREIGN PATENT DOCUMENTS

| | | |
|---|---|---|
| JP | 2004-354074 | 12/2004 |
| WO | WO 01/46708 A1 | 6/2001 |
| WO | WO 01/88482 A1 | 11/2001 |

\* cited by examiner

*Primary Examiner*—Edward Lefkowitz
*Assistant Examiner*—Freddie Kirkland, III
(74) *Attorney, Agent, or Firm*—Westerman, Hattori, Daniels & Adrian, LLP.

(57) ABSTRACT

A weight part (12) is supported by a beam part (26) in a slim piece shape supported by a frame-shaped support part (10), and the beam part (26) is provided with a piezoresistance element (20) as a transducing element that transduces a mechanical variation to an electrical variation, so that a mechanical variation of the weight part (12) is transmitted to the piezoresistance element (20) via the beam part (26). Then, the beam part (26) is constructed by stacking the silicon nitride film (16) and a resin film (18) such as a polyimide film.

9 Claims, 16 Drawing Sheets

ELECTROMECHANICAL TRANSDUCER AND METHOD OF FABRICATING THE SAME

BACKGROUND OF THE INVENTION

1. Field of the Invention

The present invention relates to an electromechanical transducer (physical sensor) that transduces a mechanical variation into an electrical signal and a method of fabricating the same.

2. Description of the Related Art

An electromechanical transducer that transduces a mechanical variation into an electrical signal is widely known at the position of a physical sensor. The sensor electrically captures a physical change which a material itself has with respect to an environmental change, and various kinds of sensors have been developed in recent years, and their sizes have been reduced.

Various kinds of products to which such sensors are applied are developed and are on the market. It is the challenges how these products are fabricated to be small and light at low cost. Accordingly, a physical sensor that is a component to be a part of the product is naturally required to be reduced in size. However, it is not allowed to degrade the performance thereof even if the physical sensor reduces in size.

Therefore, in order to enhance sensitivity of physical sensors, various kinds of sensors using different methods are conventionally developed. Taking an acceleration sensor as an example, acceleration sensors in recent years are made of semiconductors, and the typical methods include a capacitance type, a piezoelectric type and a piezoresistance type.

The capacitance type is a system for detecting a change in an electrostatic capacitance between an electrode which is fixed and does not move and an electrode which deforms and moves when acceleration is applied thereto, and uses a gap change between the electrodes to cause a capacitance change. The advantages of this system are easiness in correction with respect to a temperature change and high sensitivity. The disadvantage is that since a capacitance change between a pair of electrodes is small, a capacity change has to be increased by performing wire connection to connect a number of electrode pairs in parallel. Since a noise easily enters, a contrivance to avoid receiving an influence of stray capacitance as much as possible, such as placing a detection circuit near to the sensor or the like is required.

The piezoelectric type is a system for detecting electric charges generating due to strain applied to a piezoelectric element by acceleration or the like. The advantages of this system are compactness and light weight. The disadvantages are high output impedance and static acceleration cannot be detected.

The piezoresistance type is a system in which a resistance value of a resistance element changes in accordance with stress applied to a body provided with a piezoresistance element, and the resistance value change is detected as a voltage change by forming a bridge with a peripheral circuit. The advantages of this system are that size reduction is easy, the detection circuit is simple and the like. The disadvantage is that since the piezoresistance element is a semiconductor, change with respect to the temperature is large, and correction is required.

Among these various kinds of systems, the piezoresistance system is compact and simple, and possibility of mass production, and therefore, the piezoresistance system is widely used. What is important in the piezoresistance system is that sensitivity of the piezoresistance itself becomes low as a result of the weight becoming small with reduction in size. It is also important that sensitivity or the like necessary for a desired structure can be adjusted. Various structures and fabrication methods are contrived to adjust the sensitivity (see Patent Document 1).

An acceleration sensor of a prior art disclosed in Patent Document 1 is a semiconductor acceleration sensor in which a weight part which displaces by receiving acceleration is supported with a frame part via a flexible part, and a sensor part by piezoresistance is provided at the flexible part. An insulating film such as a silicon nitride film or the like is formed on a front surface of the flexible part, and film thickness of the insulating film is adjusted in accordance with the sensitivity to be set.

Further, it is a sensor element used as a magnetic resistance sensor, an air flow sensor, an acceleration sensor, a pressure sensor and the like, in which a front surface of a plane-shaped sensing region having a fine line supported by a sensor substrate is coated with a silicon resin film is also known (see Patent Document 2).

Further, it is also known that in the same sensor element as described above, a resin film is interposed between the sensor substrate and the sensing region (see Patent Document 3).

These Patent Documents also describe that an inorganic film such as a silicon nitride film is formed as a passivation film or an interlayer insulating film in the sensor element.

Patent Document 1: JP 2004-354074A
Patent Document 2: WO 01/046708A
Patent Document 3: WO 01/088482A In order not to reduce sensitivity even if a sensor having a structure in which a sensor part by piezoresistance is provided at a beam part that is a flexible part in a small piece shape and a mechanical variation is applied to the beam part by a weight part supported by the beam part, just like the semiconductor acceleration sensor described in the above described Patent Document 1 is made compact, the beam part is made slim and thin to be easily displaced, and sufficient durability has to be kept. Therefore, it is difficult to obtain required set sensitivity by only adjustment of the film thickness of the insulating film.

Since the sensor elements described in Patent Documents 2 and 3 do not have the structure in which the sensor part is provided at the beam part in a slim piece shape, but have the structure in which the planar sensor region is provided on the sensor substrate, flatness and protective properties of the sensor region can be enhanced by the resin film, but it is difficult to obtain sufficient sensitivity when using them as three-dimensional acceleration sensors.

SUMMARY OF THE INVENTION

The present invention has been developed to solve the problems in such conventional electromechanical transducers, and an object of the invention is to provide an electromechanical transducer having high sensitivity even when it is ultra-compact, especially suitable for a three-dimensional acceleration sensor, having a large span of adjustable range of sensitivity and high durability, and a method of fabricating the same.

In order to attain the above described object, the present invention is in an electromechanical transducer including a transducing element which transduces a mechanical variation into an electrical variation, a weight part for applying the mechanical variation to the transducing element, a beam part in a slim piece shape that supports the weight part and is provided with the transducing element, and a frame-shaped support part supporting the beam part, characterized in that the beam part is constructed by stacking a silicon nitride film and a resin film.

The resin film constructing the beam part may be provided to extend to an upper portion of the support part, and may also serve as a protection film that protects the beam part and support part.

Further, the resin film constructing the beam part can also serve as bonding means of an upper lid that covers top surfaces of the beam part and the support part. The resin film is preferably a polyimide film.

The transducing element may be a piezoresistance element, and the piezoresistance element may be composed of a polycrystalline silicon film in which an impurity is implanted, and may be formed into a turn-back shape in which it extends from two spots on a region of the support part, which supports the beam part, to the beam part in parallel and connected at tip end portions.

The weight part and support part can be formed of a silicon semiconductor substrate.

A method of fabricating an electromechanical transducer according to this invention has an oxide film forming step of providing a silicon oxide film on a front surface of a silicon semiconductor substrate, a step of providing a silicon nitride film on the silicon oxide film, a step of forming a piezoresistance element of a polycrystalline silicon film in which an impurity is implanted on the silicon nitride film, a step of patterning the polycrystalline silicon film, a step of patterning the silicon nitride film, a step of providing a resin film (preferably a polyimide film) on entire surfaces of top portions of the silicon nitride film and the piezoresistance element of the polycrystalline silicon film, a first mask step of forming a first mask on a back surface of the silicon semiconductor substrate, a first etching step of selectively performing anisotropic etching to the silicon oxide film toward the front surface from the back surface of the silicon semiconductor substrate by using the first mask, and forming a weight part and a frame-shaped support part, a step of removing the silicon oxide film, a second mask step of forming a second mask on the front surface of the silicon semiconductor substrate, a second etching step of selectively etching the resin film by using the second mask, and forming a beam part in a slim piece shape that is supported by the support part and supports the weight part by a stacked film of the patterned silicon nitride film and the resin film, and a mask removing step of removing the first mask and second mask respectively.

The step of forming the piezoresistance element may have a polycrystalline silicon film forming step of providing a polycrystalline silicon film on the silicon nitride film, a first ion implantation step of selectively providing a low density impurity region for forming a piezoresistance element by an ion implantation method on the polycrystalline silicon film, and a second ion implantation step of selectively providing a diffusion wire by an ion implantation method.

Further, the method of fabricating an electromechanical transducer may have a plasma treatment step of performing plasma treatment for an entire front surface of the resin film in a vacuum atmosphere, after the mask removing step, and a bonding step of positioning an upper lid to the frame-shaped support part on the resin film in the vacuum atmosphere used for the plasma treatment step, and bonding the upper lid by heating and pressuring.

Since the electromechanical transducer according to this invention, the transducing element is provided at the beam part in the slim piece shape that is supported by the frame-shaped support part and supports the weight part, and the beam part is constructed by stacking the silicon nitride film and the resin film, the beam part includes necessary strength and flexibility (variability) by the silicon nitride film (inorganic film) and the resin film (organic film) such as a polyimide film which differ in internal stress characteristics, and by selecting the thickness of each film and material quality of the resin film, optimum sensitivity can be obtained.

Accordingly, the electromechanical transducer which is highly sensitive though ultra-compact, especially suitable for a three-dimensional acceleration sensor, wide in span of adjustable range of sensitivity, and favorable in durability is provided.

Further, according to the method of fabricating the electromechanical transducer of this invention, the above described electromechanical transducer can be manufactured easily at low cost.

The above and other objects, features and advantages of the invention will be apparent from the following detailed description which is to be read in conjunction with the accompanying drawings.

DETAILED DESCRIPTION OF THE PREFERRED EMBODIMENTS

Hereinafter, the best mode for carrying out the invention will be more particularly described with reference to accompanying drawings.

As for embodiments of the invention, an electromechanical transducer as a physical sensor formed into a shape having a movable weight part, a support part (fixed part) that supports it, and a beam part constituted of a stacked film of a silicon nitride film and a resin film connecting the weight part and the support part, and having a structure in which a piezoresistance element is provided at its beam part as a transducing element that transduces mechanical variations into electrical variations (signal), and a method of fabricating the same will be described.

First, the embodiments of the electromechanical transducer according to the invention will be described.

First Embodiment: FIGS. 1 to 7

A structure of a first embodiment of the electromechanical transducer according to the invention will be described by using FIGS. 1 to 5.

Figure 1:
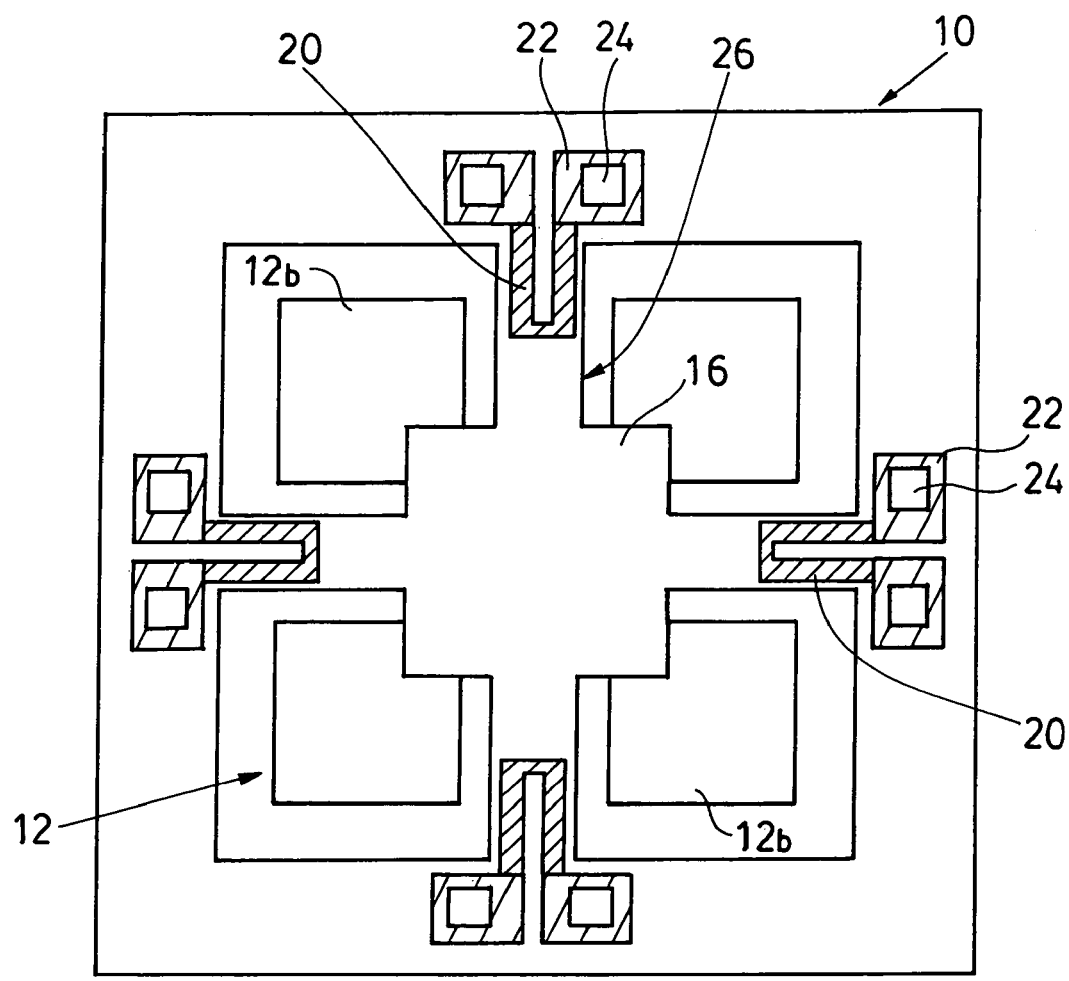
FIG. 1 is a plane view showing a state before forming a resin film of a first embodiment of an electromechanical transducer according to the invention.
Figure 2:
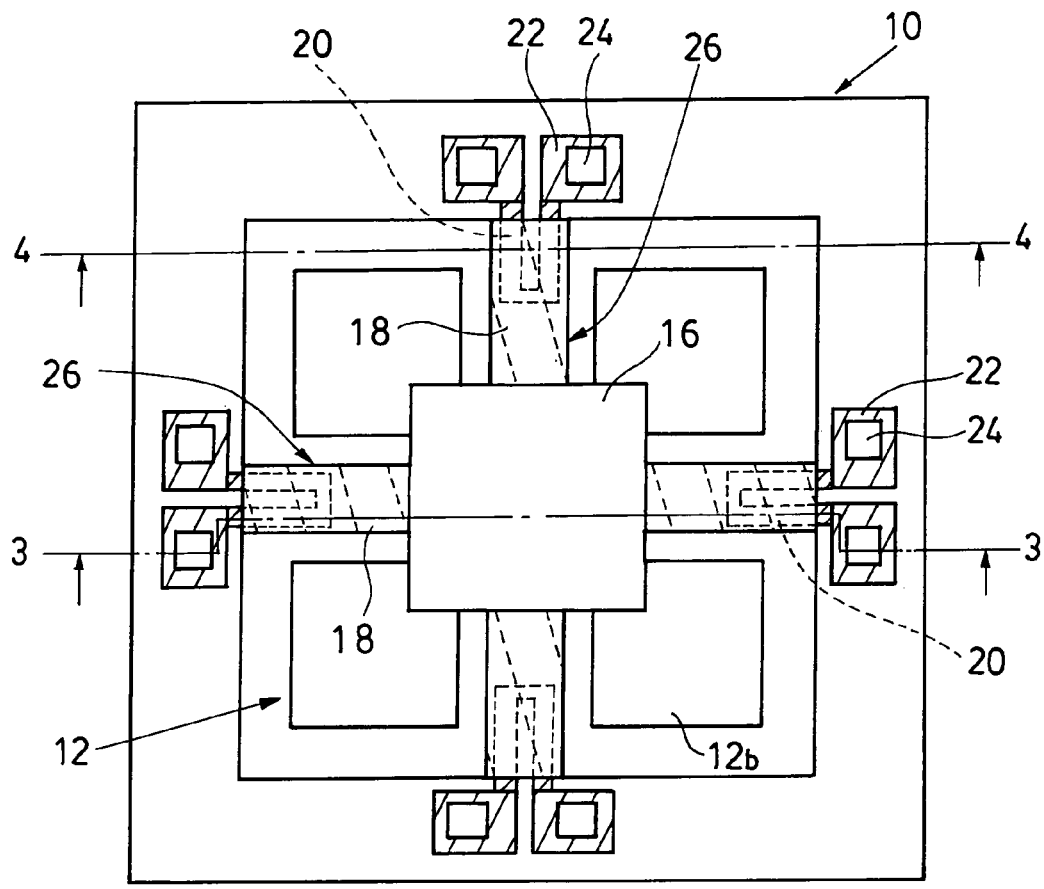
FIG. 2 is a plane view showing a state after forming the resin film of the same.
Figure 3:
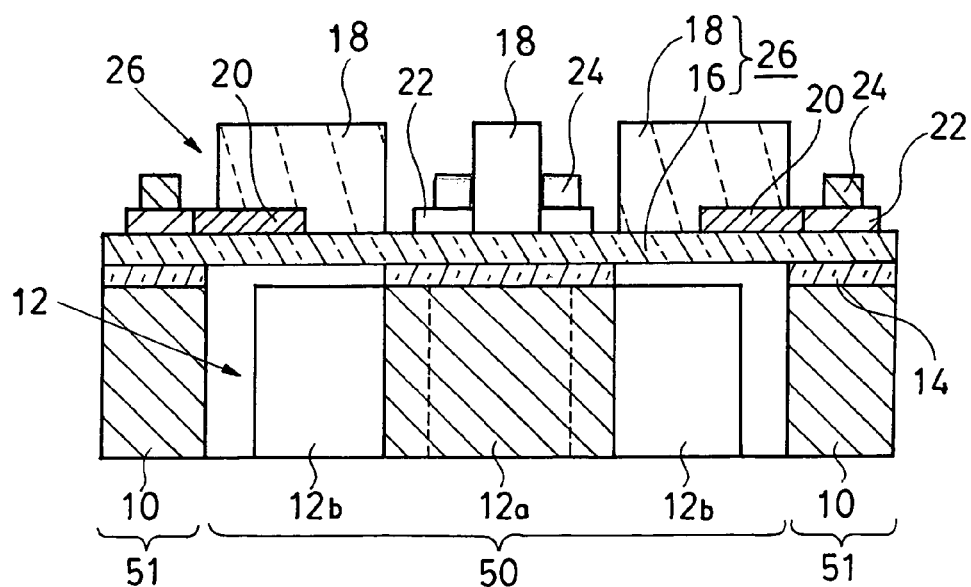
FIG. 3 is a sectional view taken along the line 3-3 in FIG. 2.
Figure 4:
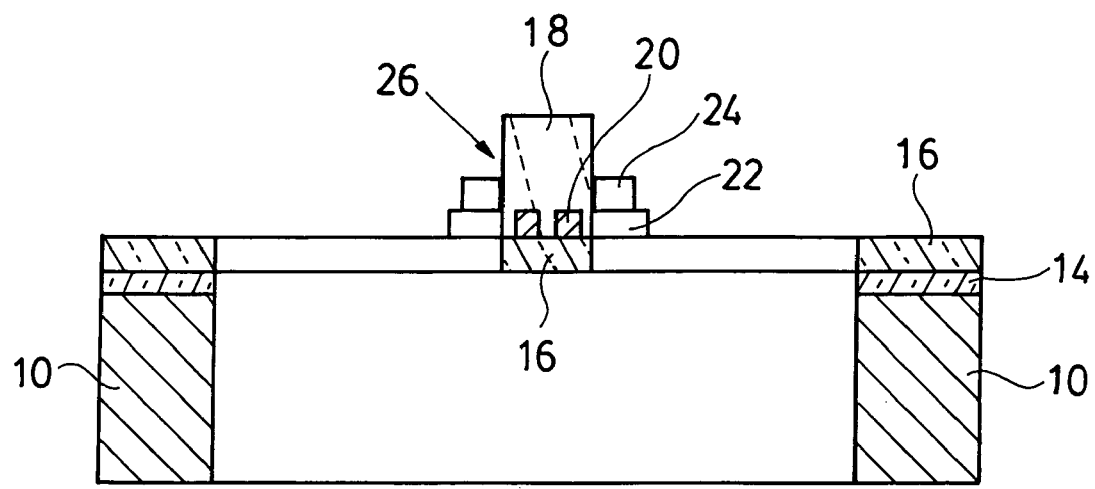
FIG. 4 is a sectional view taken along the line 4-4 in FIG. 2.
Figure 5:
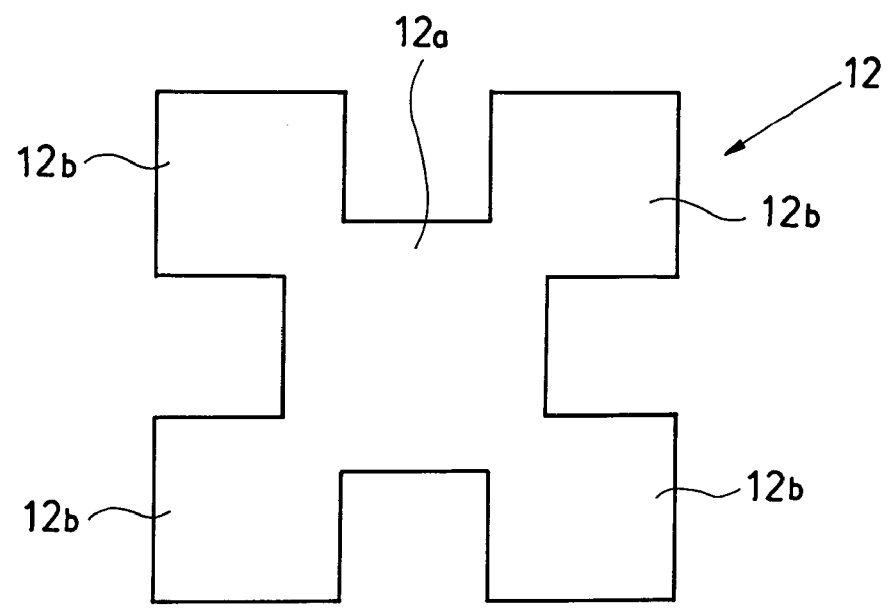
FIG. 5 is a bottom view of a weight part shown in FIGS. 1 to 3.

FIG. 1 is a plane view showing a state before forming a resin film of the electromechanical transducer, and FIG. 2 is a plane view showing a state after forming the resin film. FIG. 3 is a sectional view taken along the line 3-3 in FIG. 2, and FIG. 4 is a sectional view taken along the line 4-4 in FIG. 2. FIG. 5 is a bottom view of a weight part.

In these drawings, reference numeral 10 is a frame-shaped support part formed by a silicon semiconductor substrate, and reference numeral 12 is a weight part formed by the same silicon semiconductor substrate. Reference numeral 14 is a silicon oxide film that is a thermally oxidized film, reference numeral 16 is a silicon nitride film that is a first insulating film, reference numeral 18 is a resin film that is a second insulating film, reference numeral 20 is a piezoresistance element that is a transducing element which transduces mechanical variations into electrical variations (signal), reference numeral 22 is a diffusion wire, and reference numeral 24 is a metal wire. A beam part 26 in a slim piece shape is constructed by a stacked film of the silicon nitride film 16 that is an inorganic film and the resin film 18 that is an organic film. The beam part 26 is supported by the support part 10 and supports the weight part 12 and is provided with the piezoresistance element 20. Reference numeral 50 shown in FIG. 3 is a movable section, and is constituted of the weight part 12 and the beam part 26. Reference numeral 51 is a fixed section constituted of the support part 10 and supports the movable section 50.

As shown in FIGS. 3 and 2, the resin film 18 is present at only the beam part 26, and the beam part 26 in the slim piece shape is constructed by the silicon nitride film 16 and the resin film 18.

FIG. 3 shows a section cut along a longitudinal direction of the beam part 26, and the silicon nitride film 16 is shown to continue in a lateral direction in the drawing, but since FIG. 4 shows a section cut along a short side direction of the beam part 26, the silicon nitride film 16 seems to be divided into three.

As is clearly shown in FIG. 5, the weight part 12 is integrally constructed by a central weight portion 12a in a substantially cubic shape, and four outer weight portions 12b each in a substantially cubic shape extended in a diagonal line direction from each of four corner portions of the central weight portion. The weight part 12 is disposed at the same height in the support part 10 forming a frame body in a substantially square tube shape, and they can be formed from the same silicon semiconductor substrate by etching.

The beam part 26 in the slim piece shape by the stacked film of the silicon nitride film 16 and the resin film 18 are provided at four spots to connect the support part 10 and the central portion 12a of the weight part 12 along the lines connecting central portions of respective sides of the support part 10, as is clearly shown in FIG. 2.

The characteristic structure of the electromechanical transducer is that the movable section 50 includes the piezoresistance element 20 that transduces mechanical variations into electrical variations, and the weight part 12 for applying mechanical variations to it, each beam part 26 which supports the weight part 12 and is provided with the piezoresistance element 20 is the stacked film of the silicon nitride film 16 and the resin film 18, and the respective films differ in the film thickness and stress characteristics. The stress characteristics are the characteristics of the internal stress of the film, and the internal stress includes tensile stress and compression stress.

By adjusting the film thickness and internal stress of the silicon nitride film 16 and the resin film 18 which construct the stacked film, the characteristics of the entire beam part 26 of the stacked film can be adjusted to desired characteristics. The characteristics of the entire beam part 26 means transmissibility of the stress applied to the beam part (strain of the beam part 26), and the stress characteristics of the beam part 26. For example, in accordance with the shape and weight of the weight part 12, strain applied to the beam part 26 is made easily to transmit to the piezoresistance element 20, or is made difficult to transmit on the other hand, or the like. The tensile stress may be made strong or the compression stress may be made strong, and they can be freely selected.

In this embodiment, a polyimide film is used as the resin film, and each beam part 26 is constructed by the stacked film of the silicon nitride film 16 and the polyimide film as the resin film 18. The piezoresistance element 20 is formed into a turn-back shape (U-shape or a channel shape) in which it extends from two spots on a region of the support part 10 which supports the beam part 26 on the silicon nitride film 16 to the beam part 26 in parallel and connected at tip end portions, by a polycrystalline silicon film in which an impurity is implanted.

Naturally, the shape and the number of the piezoresistance elements 20 can be freely selected in accordance with the characteristics of the electromechanical transducer of the present invention. For example, in the plane view shown in FIG. 2, the horizontal direction is set as an X direction, the vertical direction is set as a Y direction, and a direction orthogonal to the X direction and the Y direction is set as a Z direction. With the piezoresistance element 20 formed into a rectangular shape, the piezoresistance element 20 for detecting the X direction is provided at the beam part 26 in the X direction, the piezoresistance element 20 for detecting the Y direction is provided at the beam part 26 in the Y direction, and the piezoresistance element 20 for detecting the Z direction is provided at the beam part 26 in the X direction or the beam part 26 in the Y direction, respectively.

By the construction as above, the sensor which detects accelerations in the X direction, Y direction and the Z direction can be constructed by only one electromechanical transducer of the present invention.

A pair of diffusion wires 22 are formed to connect to both end portions of the piezoresistance element 20 on the support part 10, and the metal wires 24 that is a wire for connecting to an external circuit is formed on each of the diffusion wires 22. The metal wires 24 is formed from aluminum, for example.

By forming each of the piezoresistance elements 20 like this, the effective length of each of the piezoresistance elements 20 becomes long, and each of the piezoresistance elements 20 is susceptible to stress since it extends into the beam part 26 across the border of the fixed section 51 and the movable section 50, thus enhancing the detection sensitivity. Further, the diffusion wires 22 and the metal wires 24 for wiring are easily provided.

The piezoresistance element 20 operates as a sensor as a result that a change in resistance value occurs due to strain exerted on the beam part 26 by the force applied onto the weight part 12. In this embodiment, two piezoresistance elements 20 are disposed on each of the beam parts 26 in the direction orthogonal to each other, and by combination of changes in resistance values of four piezoresistance elements 20, the accelerations or the like corresponding to the respective directions can be detected.

In this embodiment, the piezoresistance element 20 is provided on the silicon nitride film 16 so that its one surface is in contact with the surface where the silicon nitride film 16 is in contact with the resin film 18. Naturally, the position where the piezoresistance element 20 is provided can be freely selected inside the beam part 26. However, the piezoresistance element 20 preferably has the construction in which its front surface is covered with the silicon nitride film 16 or the resin film 18 instead of being on the front surface of the beam part 26. This is for avoiding change in the resistance value due to adherence of dust, impurities and the like to the surface because the piezoresistance element 20 is a transducing element of which resistance value changes by receiving stress by strain.

Naturally, a protection film may be provided on the front surface of the piezoresistance element 20 for such a purpose. This protection film can be constructed by, for example, a TEOS (TETRAETHOXYSILANE) film. Since the beam part 26 is constructed by the stacked film composed of a plurality of films, the protection film may be made a component of the beam part 26. The construction in this case will be described later.

The characteristic of the electromechanical transducer according to the invention is that the silicon nitride film 16 and the resin film 18 differing in the stress characteristics such as the film thickness or material quality are stacked to be a stacked film, and this is used as the beam part 26, whereby, the beam part 26 has proper flexibility and strength, and can efficiently transmit the stress to the piezoresistance element 20. Further, the position of the piezoresistance element 20 in the longitudinal direction and the thickness direction is changed in the beam part 26, and thereby, the optimum position to transmit stress to the piezoresistance element 20 can be selected.

Figure 6:
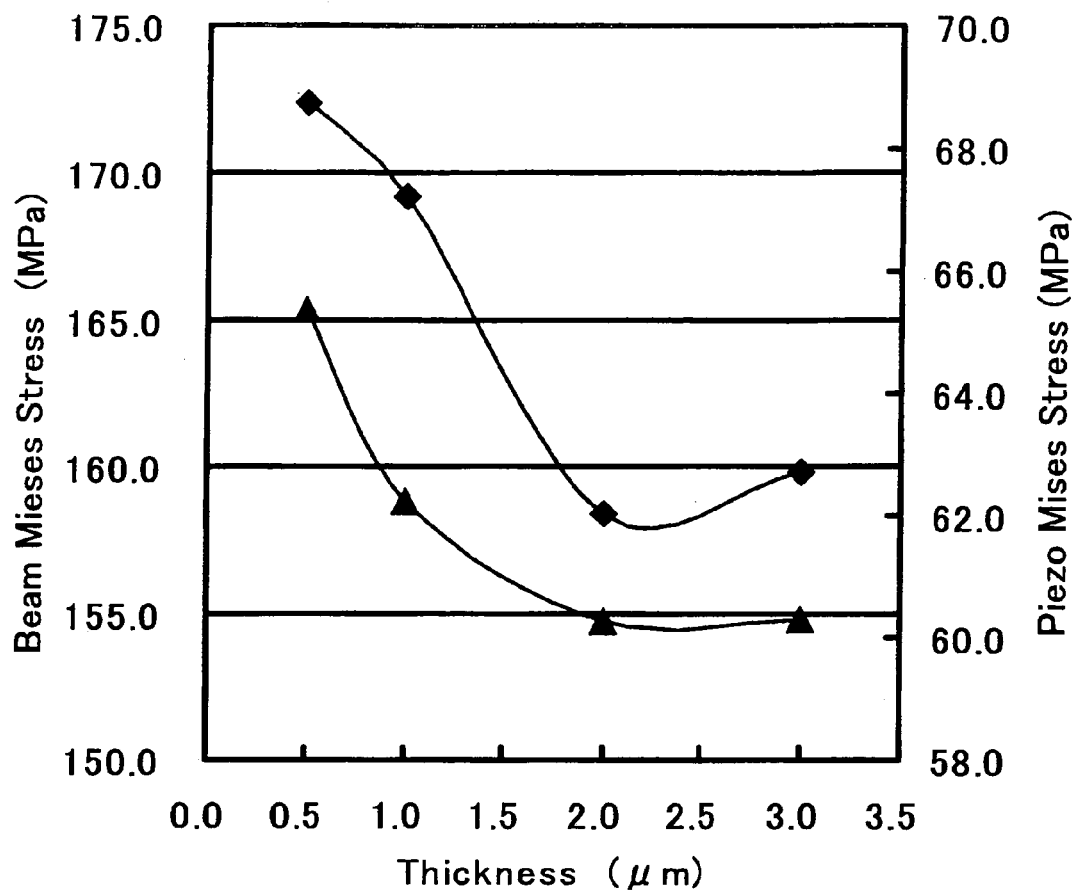
FIG. 6 is a diagram showing the relationship between stress of the beam part and the change in stress exerted on the piezoresistance element when the film thickness of the silicon nitride film is fixed and the film thickness of the resin film is set as a parameter in the first embodiment of the invention.

Next, the stress change when the film thickness of the resin film 18 is changed will be described. In FIG. 6, the film thickness of the silicon nitride film 16 is fixed to 0.1 μm. FIG. 6 is a graph showing change in stress of the beam part 26 and stress on the piezoresistance element 20.

In FIG. 6, the vertical axis at the left side expresses the internal stress of the beam part 26, and the vertical axis at the right side expresses the internal stress of the piezoresistance element 20. The horizontal axis expresses the film thickness of the resin film 18. The square marks express the characteristics of the beam part 26 and the triangular marks express the characteristics of the piezoresistance element 20.

By changing the film thickness of the resin film 18, the internal stress of the entire beam part 26 which is the stacked film of the silicon nitride film 16 and the resin film 18 can be changed, and the internal stress of the piezoresistance element 20 changes in accordance with the internal stress.

As shown in FIG. 6, when the film thickness of the resin film 18 by the polyimide film exceeds 20 times as large as 0.1 μm that is the film thickness of the silicon nitride film 16, the internal stress of the beam part 26 and the piezoresistance element 20 hardly change with respect to the film thickness of the resin film 18. Namely, it becomes difficult for it to transmit the stress from the weight part 12. Accordingly, the film thickness of the resin film 18 is preferably within 20 times as large as the film thickness of the silicon nitride film 16. In doing so, strain applied to the beam part 26 can be efficiently transmitted to the piezoresistance element 20.

The stress change of the entire beam part 26 when the film thickness of the resin film 18 is changed is described as one example, but the same result can be obtained when the internal stress of the resin film 18 is changed. One example of changing the internal stress is changing the material of the film. For example, as photosensitive polyimide, an ester linkage type and a salt linkage type are known. They differ in mechanical characteristics (compression, tensile strength and the like) from each other, and therefore, they can be used in accordance with desired stress characteristics.

Further, there is a photoresist or the like widely known as a photosensitive resin film used for fabrication of a semiconductor device, and this may be used.

Naturally, the same result can be also obtained by changing the film thickness of the silicon nitride film 16 with the film thickness of the resin film 18 fixed, and the same result can be obtained by changing the internal stress of the silicon nitride film 16.

Further, either or both of the silicon nitride film 16 and the resin film 18 may be formed by a plurality of films and stacked in three layers or more to construct the beam part.

Further, sensitivity changes depending on the position of the piezoresistance element 20 provided in the stacked film of the beam part 26.

Figure 7:
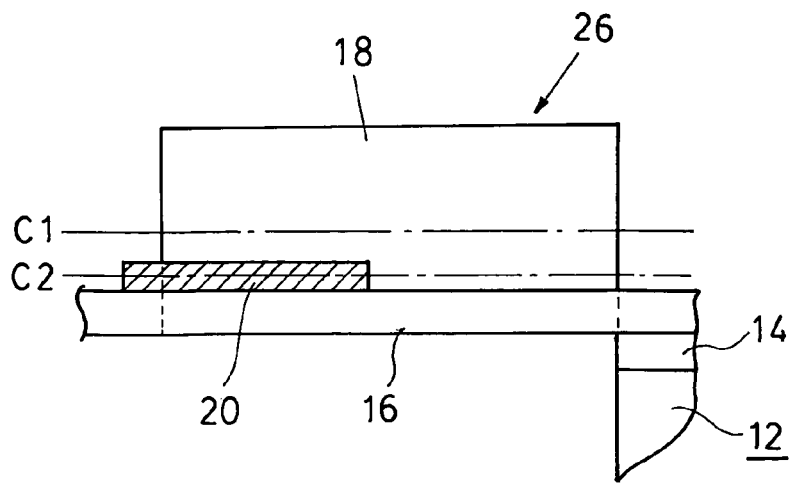
FIG. 7 is a schematic sectional view for explaining the position of the piezoresistance element in the beam part in the first embodiment of the invention.

FIG. 7 is a schematic sectional view for explaining the position of the piezoresistance element 20 in the beam part 26 in this embodiment. As shown in FIG. 7, a center line C1 of the beam part 26 and a center line C2 of the piezoresistance element 20 do not coincide with each other. Namely, the piezoresistance element 20 is provided in the beam part 26 so that the center position of the thickness of the piezoresistance element 20 and the center position of the film thickness of the beam part 26 differ from each other. By adopting such a construction, the piezoresistance element 20 can strongly transmit the strain exerted on the beam part 26, and therefore, the detection sensitivity is enhanced.

If the piezoresistance element 20 is provided in the beam part 26 so that the center line C2 of the piezoresistance element 20 coincides with the center line C1 of the beam part 26, even when the stress exerted on the beam part 26 is the same, the compression stress and the tensile stress are applied to the piezoresistance element 20 in the same ratio, and therefore, detection sensitivity is not enhanced.

The example shown in FIG. 7 shows the case where the piezoresistance element 20 is provided below the center line C1 of the beam part 26, namely, at the side of the weight part 12 from the center line C1, but the position of the piezoresistance element 20 is not limited to this. The center line C2 of the piezoresistance element 20 may be located above the center line C1, namely at the side away from the weight part 12 from the center line C1. The position where the piezoresistance element 20 is provided can be freely selected in accordance with the shape and the weight of the weight part 12, but the important thing is that the piezoresistance element 20 is not provided at the center in the film thickness direction of the beam part 26.

Figure 8:
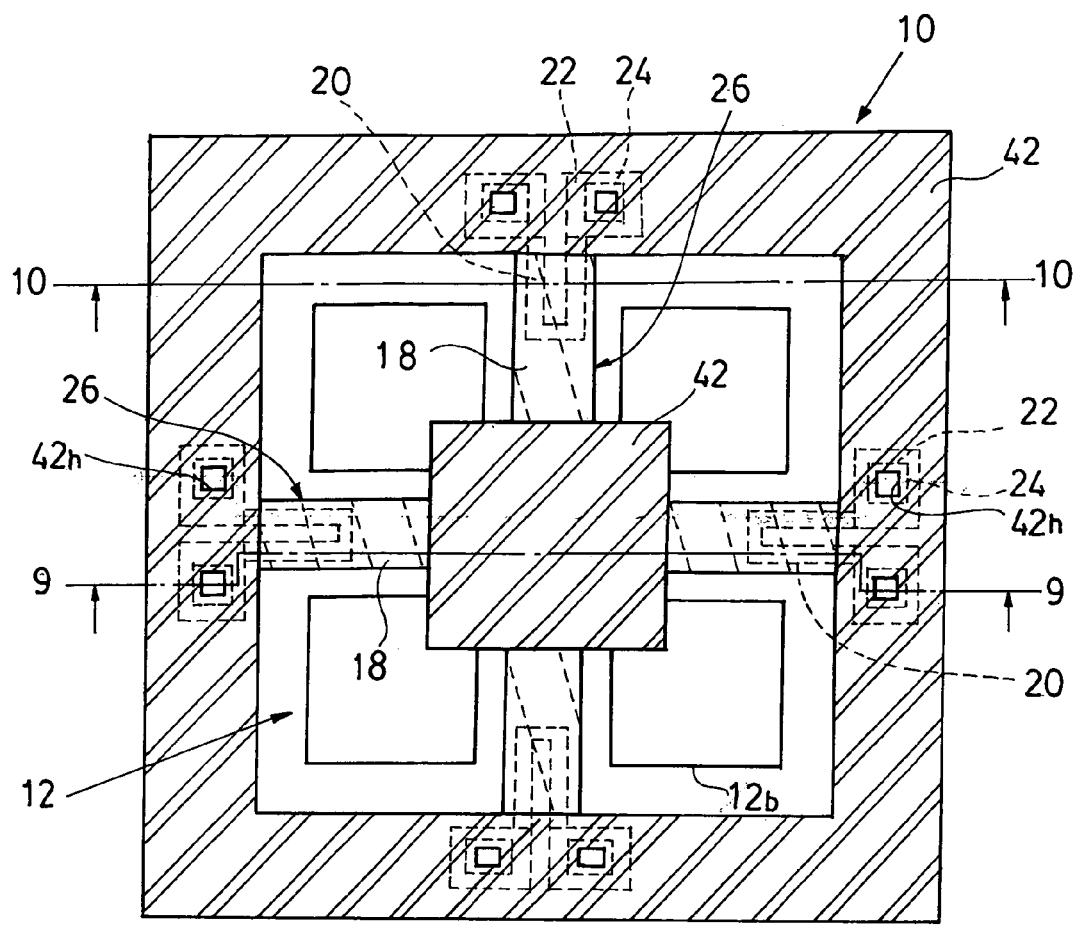
FIG. 8 is a plane view of a second embodiment of the electromechanical transducer according to the invention.
Figure 9:
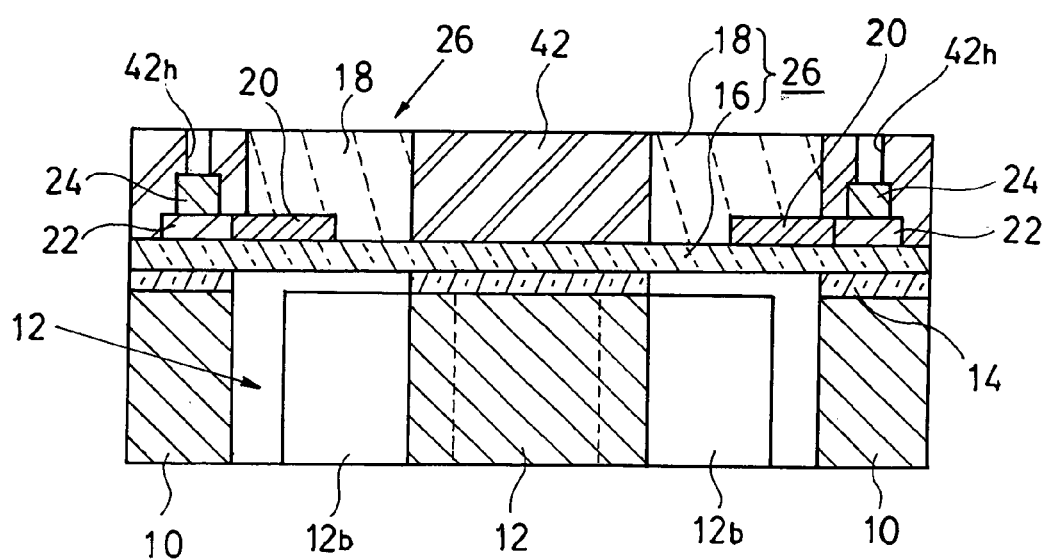
FIG. 9 is a sectional view taken along the line 9-9 in FIG. 8.
Figure 10:
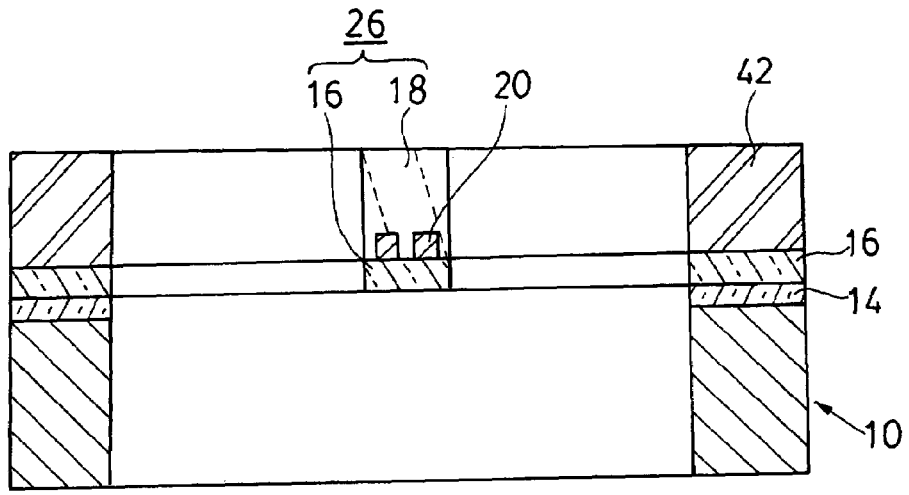
FIG. 10 is a sectional view taken along the line 10-10 in FIG. 8.

Second Embodiment: FIGS. 8 to 10

Next, a second embodiment of the electromechanical transducer according to this invention will be described by using FIGS. 8 to 10. FIG. 8 is a plane view of the electromechanical transducer, FIG. 9 is a sectional view taken along the line 9-9 in FIG. 8, and FIG. 10 is a sectional view taken along the line 10-10 in FIG. 8. In these drawings, the same reference numerals are given to the same parts as in FIGS. 1 to 5, and the explanation of them will be omitted.

In the second embodiment, the point in which it differs from the aforementioned first embodiment is only the point that a protection film 42 is formed on an entire top surface of the silicon nitride film 16 that is the first insulating film on the frame-shaped support part 10 and on the central weight portion 12*a* of the weight part 12. However, openings 42*h* for wiring are formed in portions of the protection film 42, at which the diffusion wires 22 and the metal wires 24 are provided, above the support part 10.

As already described, the piezoresistance element 20 sometimes changes in resistance value due to adherence of dust, impurities or the like if its front surface is exposed, and therefore, it is desirable to provide the protection film on the front surface of the piezoresistance element 20.

In the aforementioned first embodiment, the piezoresistance element 20 is protected by using the resin film 18 constructing the beam part 26 as a protection film. However, since the resin film 18 is present at only an upper portion of the beam part 26, the other portions are not protected. Thus, in the second embodiment, the piezoresistance element 20 is completely protected by covering the other portions with the protection film 42.

The material of the protection film 42 is not especially limited if only it is an insulating film, and can be constructed by, for example, a TEOS (TETRAETHOXYSILANE) film.

In the example shown in FIGS. 8 to 10, the protection film 42 is made so that its film top surface and the resin film 18 are flat, but the protection film 42 is not limited to this. The respective film thicknesses can be freely selected without being influenced by each other.

Figure 11:
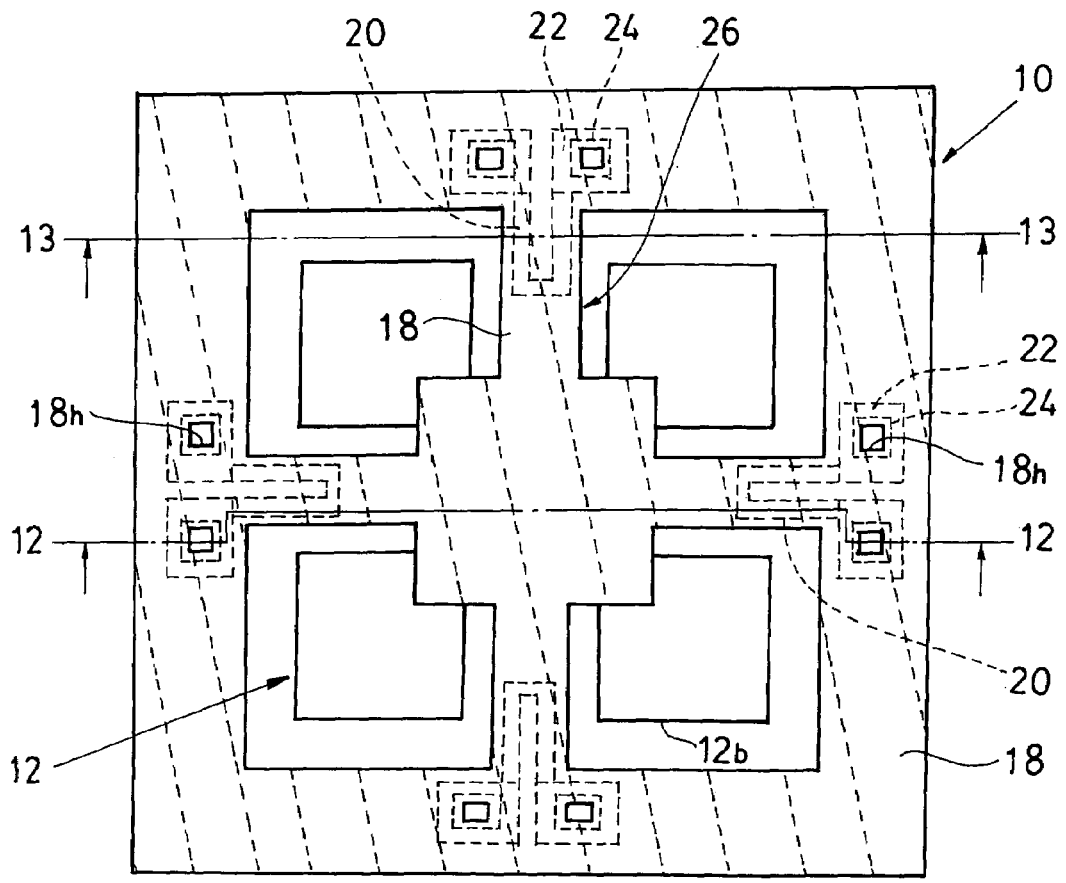
FIG. 11 is a plane view of a third embodiment of the electromechanical transducer according to the invention.
Figure 12:
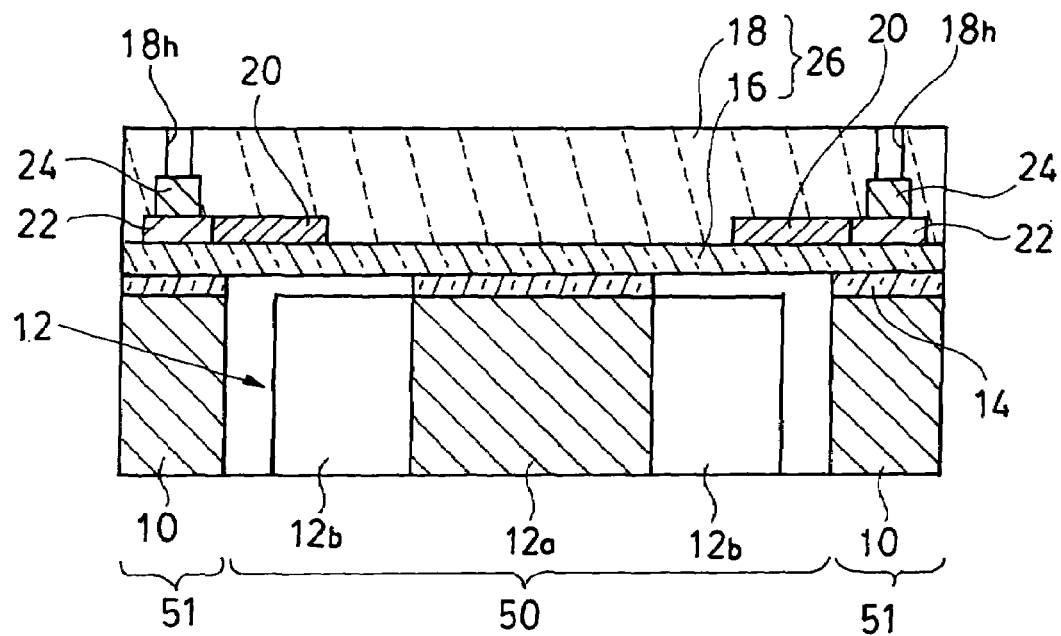
FIG. 12 is a sectional view taken along the line 12-12 in FIG. 11.
Figure 13:
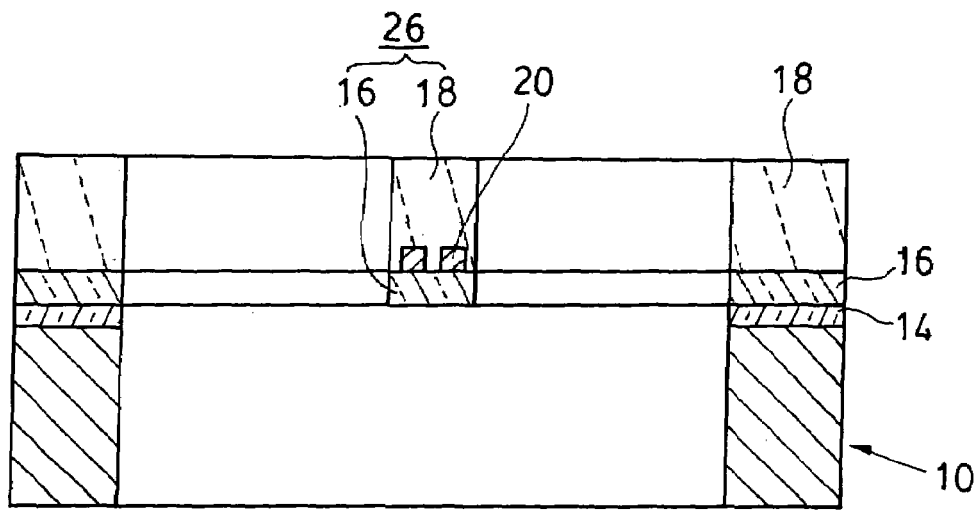
FIG. 13 is a sectional view taken along the line 13-13 in FIG. 11.

Third Embodiment: FIGS. 11 to 13

Next, a third embodiment of an electromechanical transducer according to this invention will be described by using FIGS. 11 to 13. FIG. 11 is a plane view of the electromechanical transducer, FIG. 12 is a sectional view taken along the line 12-12 in FIG. 11, and FIG. 13 is a sectional view taken along the line 13-13 in FIG. 11. In these drawings, the same reference numerals are given to the same portions as in FIGS. 1 to 5 and FIGS. 8 to 10, and the explanation thereof will be omitted.

It should be noted that the resin film 18 in FIGS. 2 to 4 and FIGS. 8 to 10, and the resin film 18 in FIGS. 11 to 13 differ in their shapes, but are the resin films of the same material, and therefore, the same reference numeral is given to them for convenience.

In this third embodiment, a point in which it differs from the aforementioned second embodiment is only the point that a protection film is integrally formed of the same polyimide as the resin film 18 which composes the beam part 26.

As shown in FIGS. 11 to 13, in the electromechanical transducer of the third embodiment, the resin film 18 on the silicon nitride film 16 composing the beam part 26 is formed to extend on the frame-shaped support part 10 and the entire top surface of the central weight portion 12*a* of the weight part 12, and is used as the protection film. Namely, a part of the film composing the beam part 26 also serves as the protection film. By adopting such a construction, it is not necessary to provide the protection film 42 which covers the top surface of the electromechanical transducer separately as in the case of the aforementioned second embodiment.

This resin film 18 is also formed by the polyimide film, and covers the upper portions of the movable section 50 and the fixed section 51 as the protection film. As is known from FIGS. 11 and 12, the resin film 18 is also formed on the entire surface including the beam part 26, namely, on the top surfaces of the central weight portion 12*a* and the support part 10, and therefore, this resin film 18 is a member composing the beam 26 and also plays a role of protecting the support part 10 at the same time.

Naturally, openings 18*h* for wiring are formed in portions, where the diffusion wires 22 and the metal wires 24 are provided, on the support part 10 of the resin film 42.

Figure 14:
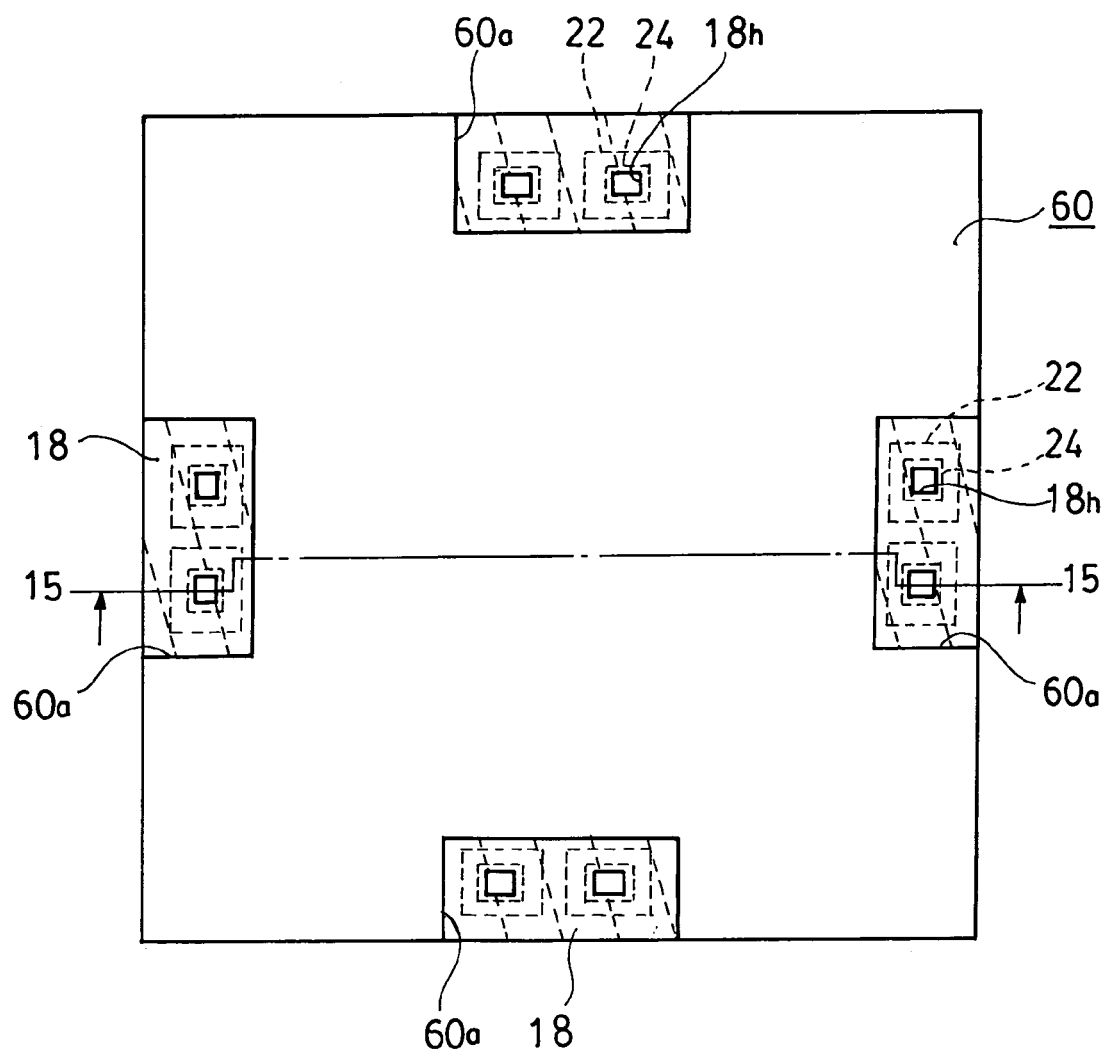
FIG. 14 is a plane view of a fourth embodiment of the electromechanical transducer according to the invention.
Figure 15:
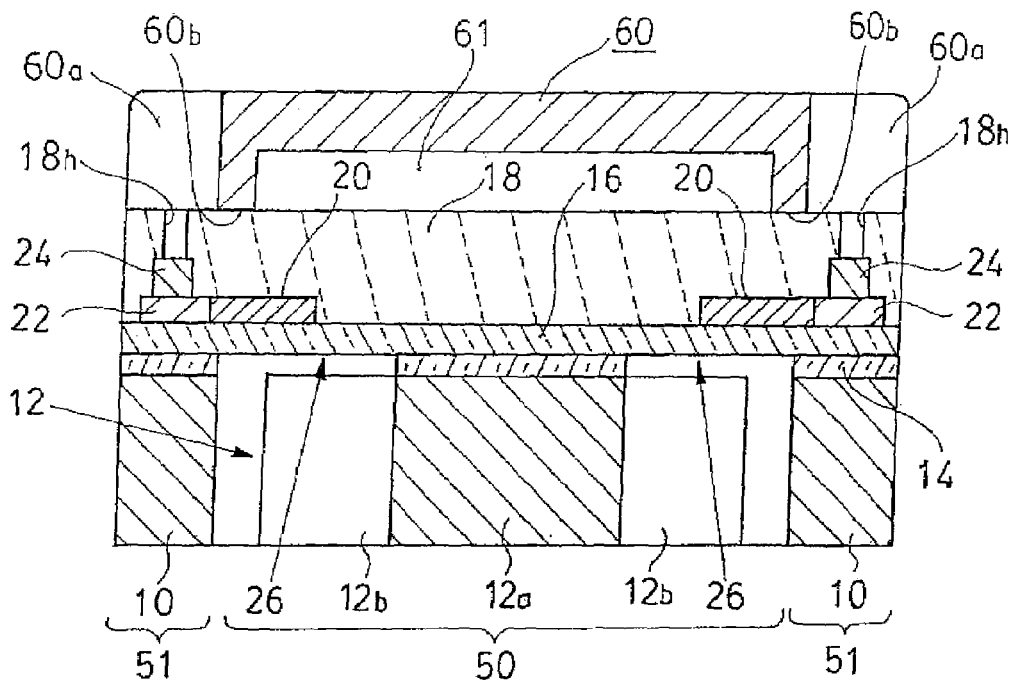
FIG. 15 is a sectional view taken along the line 15-15 in FIG. 14.
Figure 16:
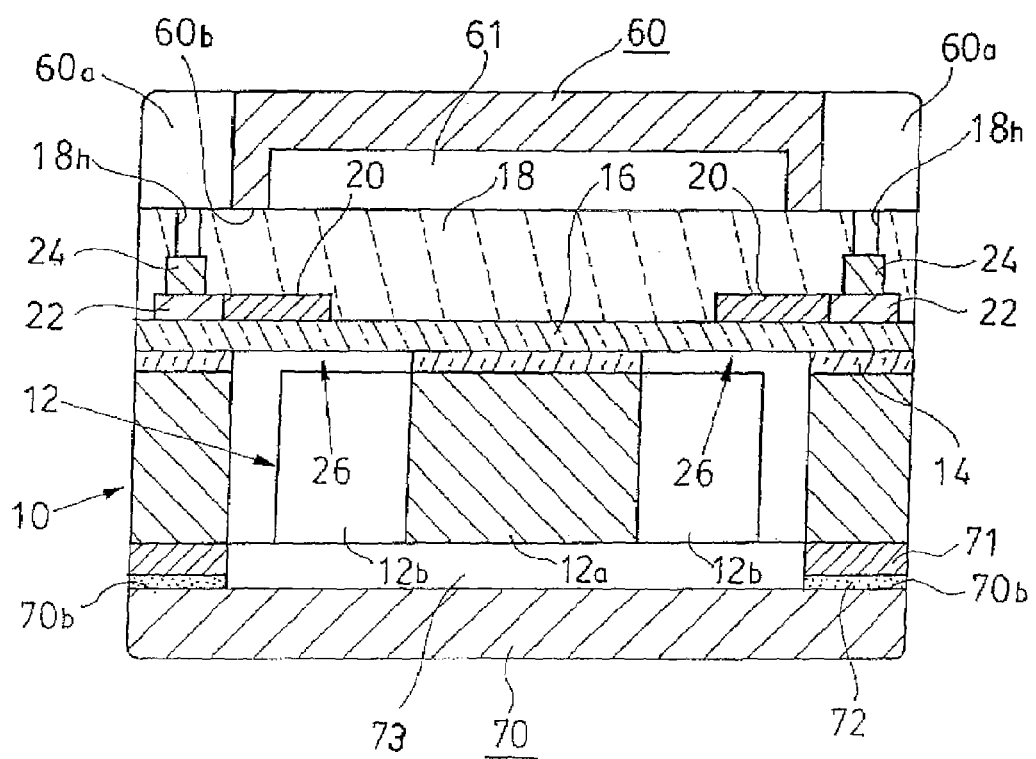
FIG. 16 is a sectional view taken along the line 15-15 in FIG. 14 when a lid is also mounted.

Fourth Embodiment: FIGS. 14 to 16

Next, a fourth embodiment of the electromechanical transducer according to this invention will be described by using FIGS. 14 to 16. FIG. 14 is a plane view of the electromechanical transducer. FIG. 15 is a sectional view taken along the line 15-15 in FIG. 14. As shown in FIGS. 14 and 15, a structure in which an upper lid is mounted on the electromechanical transducer of the present invention is shown. FIG. 16 is the same sectional view as FIG. 15 in the case where a back lid is also mounted. In these drawings, the same reference numerals and characters are given to the same portions in FIGS. 1 to 5 and FIGS. 8 to 13, and the explanation of them will be omitted.

The construction of the electromechanical transducer of this fourth embodiment is the same as the electromechanical transducer of the aforementioned third embodiment in the other points than the point that the upper lid 60 is mounted.

In the electromechanical transducers of the aforementioned second and third embodiments, the upper portions of the support part 10, the beam part 26 and the central weight portion 12*a* are protected by the resin film 18 or the resin film 18 and the protection film 42, but when the electromechanical transducer is sealed with plastic mold or the like, there is the fear that the plastic mold enters the movable section 50 and hinders its mobility.

Thus, in this fourth embodiment, the structure in which an upper lid 60 is mounted on the upper portion of the electromechanical transducer is further adopted.

As shown in FIGS. 14 and 15, the upper lid 60 has a square outer shape in the same size as the outer shape of the support part 10, only its peripheral portion is thick, its lower end surface portion is a bonded portion 60b, an inside of it is thin, and it is in a cap shape with its inner surface is recessed upward. In the vicinity of a periphery of a central portion in each side of the upper lid 60, four escape portions 60a are provided to expose the portions each with two diffusion wires 22 and metal wires 24 formed for each of the piezoresistance elements 20.

In the fourth embodiment, the resin film 18 by polyimide which is also used as the protection film in the third embodiment also serves as bonding means on the occasion of mounting the upper lid 60. As shown in FIG. 15, the resin film 18 composing the beam part 26 with the silicon nitride film 16 is extensively provided to the upper portion of the support part 10 to serve as the protection film, and by using the portion in the vicinity of the outer peripheral portion of the resin film 18 as an adhesive, the bonding portion 60b is bonded to the resin film 18 by heating and pressuring, after the upper lid 60 is positioned and mounted. Before the upper lid 60 is bonded, the entire front surface of the resin film 18 may be subjected to plasma treatment. This is because the front surface of the resin film 18 is activated by the plasma treatment.

As shown in FIG. 15, a clearance 61 is provided between the upper lid 60 and the top surface of the movable section 50 so as not to hinder the movable section 50 when it moves. The size of the clearance 61 is not limited to the example shown in the drawing.

By adopting such a construction, it is not necessary to provide bonding means such as an adhesive specially to bond the upper lid 60.

Naturally, in the case of the electromechanical transducers of the first and second embodiments, the same lid as the upper lid 60 may be mounted on their top surfaces by using the bonding means such as an adhesive. By adopting such a construction, the front surface side of the electromechanical transducer according to this invention is reliably protected.

As shown in FIG. 16, when a back lid 70 is also mounted on the back surface side of the electromechanical transducer, it can be more reliably protected. In the example shown in FIG. 16, a spacer layer 71 is formed on the bottom surface of the frame-shaped support part 10 by plating or the like, then an adhesive 72 is coated thereon, and a bonding portion 70b of the planar back lid 70 is bonded thereto. In this manner, a clearance 73 is provided between the bottom surface of the weight part 12 and the back lid 70, so that the weight part 12 is not hindered when it varies.

The saucer-shaped back lid recessed to a lower side symmetrically with the upper lid 60 may be bonded to the bottom surface of the support part 10 by the adhesive 72 without forming the spacer layer 71. However, the planar back lid is simpler in structure, and has the advantage that it is easily positioned to the support part 10 at the time of mounting, and is favorable in operability.

Embodiment of Fabricating Method: FIGS. 17 to 29

Next, a method of fabricating an electromechanical transducer according to this invention will be described by using FIGS. 17 to 29. These drawings are views showing a fabrication process of the electromechanical transducer according to this invention, and FIGS. 17 to 24 and FIGS. 26, 28 and 29 are end surface views of a cross section corresponding to the position passing through the aforementioned piezoresistance element 20 and the metal wire 24 (see FIGS. 25 and 27). In these drawings, the same reference numerals and characters are given to the portions corresponding to each of the drawings explained thus far.

In the fabricating method which will be described hereinafter, the example of the case where the silicon nitride film is used as the first insulating film and a polyimide film is used as a resin film which is the second insulating film will be described as an example.

Figure 17:
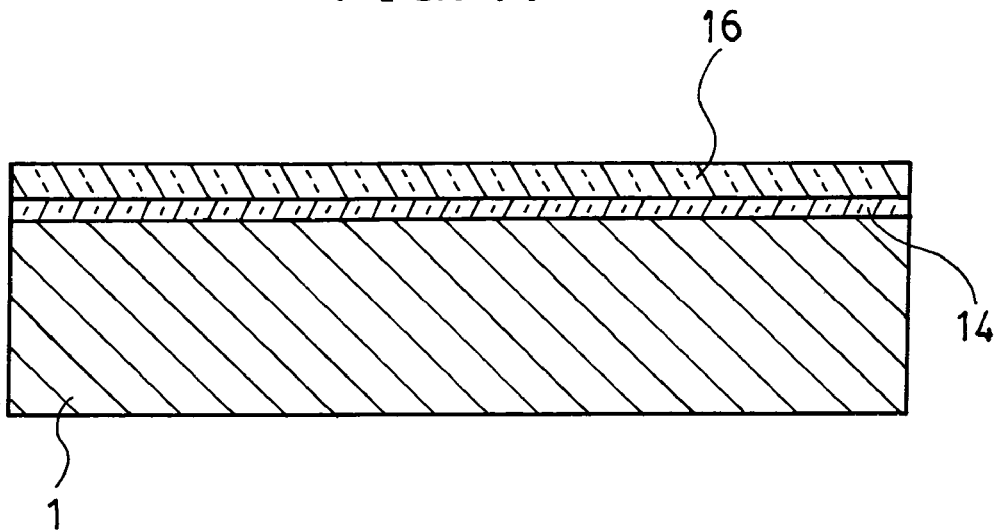
FIGS. 17 to 24 are end views in cross section showing the respective steps of the fabrication process of the electromechanical transducer according to the invention.

First, as shown in FIG. 17, the silicon oxide film 14 which is a thermally oxidized film is formed on the upper portion of the silicon semiconductor substrate 1 to the thickness of 0.3 μm.

Next, the silicon nitride film 16 is formed on the upper portion of the silicon oxide film 14. As one example, the silicon nitride film 16 of 0.1 μm is formed. The silicon nitride film is frequently used in LSI fabrication processes, and is a very good material with hydrofluoric acid resistance, thermal stability and the like. It is possible to control internal stress by controlling the composition of silicon and nitrogen.

Figure 18:
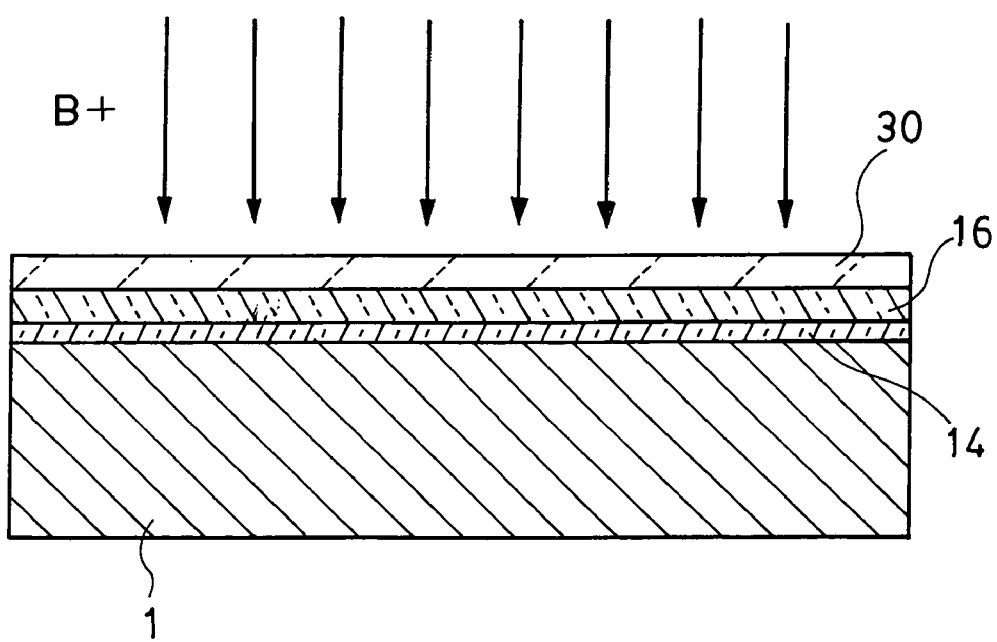

Next, as shown in FIG. 18, a polycrystalline silicon film 30 is formed on the upper portion of the silicon nitride film 16. Boron ($B^+$) is ion-implanted on the entire surface of the polycrystalline silicon film 30 under the conditions of 25 KeV and $1.0 \times 10^{15}$ (atoms/cm$^2$). This is a first ion-implantation process step.

The polycrystalline silicon film 30 becomes the piezoresistance element 20 by being worked into a desired shape in the subsequent process step. Accordingly, the film thickness of the polycrystalline silicon film 30 is optionally selected in accordance with the characteristics of the piezoresistance element 20. As one example, it is formed with the thickness of 0.2 μm. Polycrystalline silicon is used as a gate electrode or resistor in LSI fabrication processes, and by optimizing the film forming conditions, it becomes a stable resistance material with uniform grain size and less surface roughness.

By making the P type conductive resistor by implanting boron ($B^+$) into the polycrystalline silicon film 30 as an impurity, the advantage of functioning as piezoresistance with high strain sensitivity is obtained.

Figure 19:
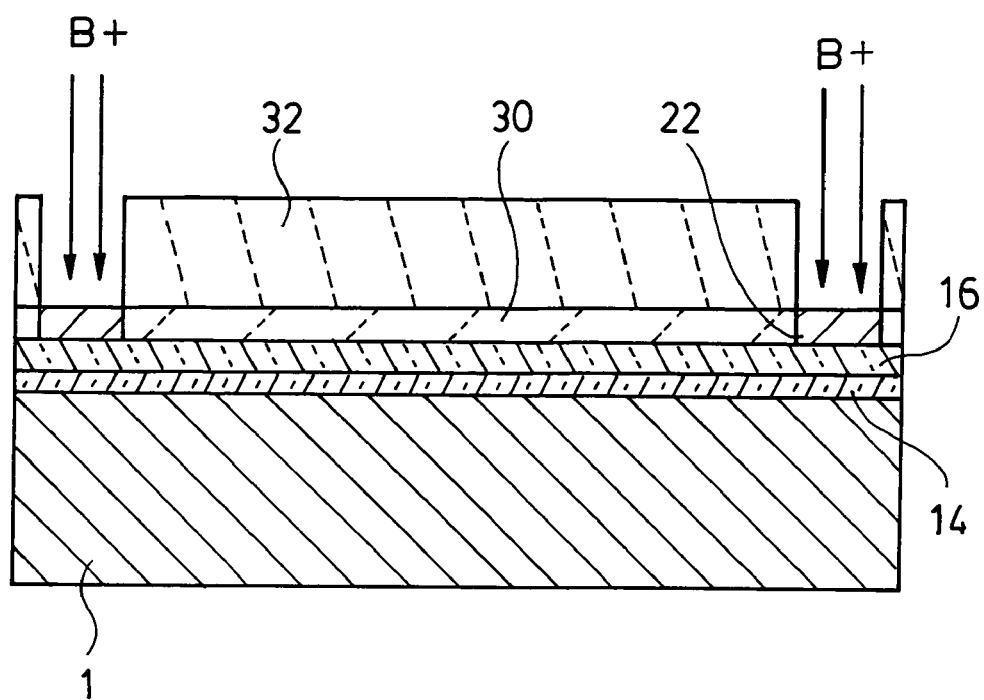

Next, as shown in FIG. 19, after a photoresist 32 of a photosensitive resin is provided at the upper portion of the polycrystalline silicon film 30, the photoresist 32 is selectively patterned to open the region at which the diffusion wires 22 are desired to be formed. Thereafter, boron ($B^+$) is ion-implanted under the conditions of 30 KeV and $1.0 \times 10^{16}$ (atoms/cm$^2$). This is a second ion implantation process step. By this process step, each of the diffusion wires 22 is formed. Thereafter, the photoresist 32 is removed.

Figure 20:
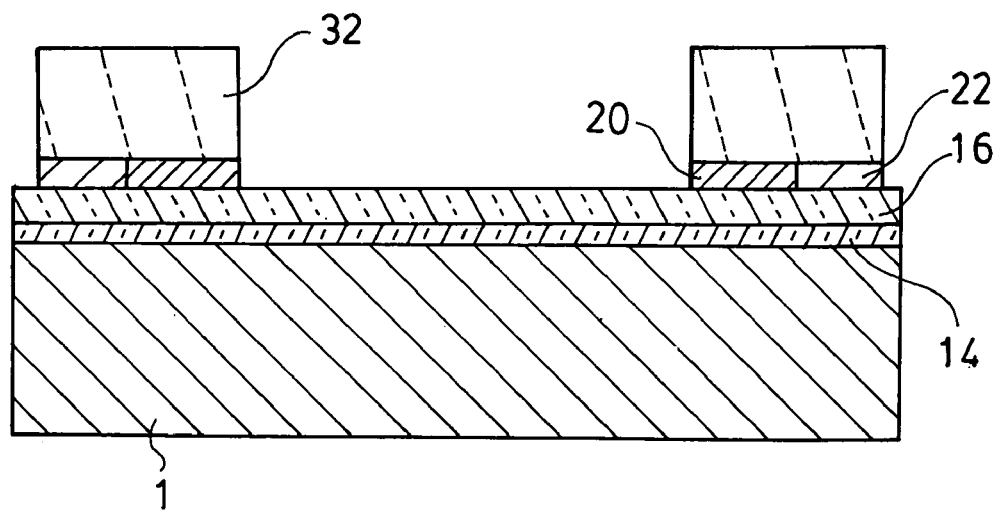

Next, after the photoresist 32 is formed again on the upper portion of the polycrystalline silicon film 30, the photoresist 32 is patterned corresponding to the shape in which the piezoresistance element 20 is desired to be formed. Thereafter, as shown in FIG. 20, by a dry etching method, the polycrystalline silicon film 30 is selectively etched to be in a desired shape, and the piezoresistance element 20 is formed. Thereafter, the photoresist 32 is removed.

Though not shown in the drawing, after the photoresist is formed in a pattern for forming the silicon nitride film 16 into a desired shape, the silicon nitride film 16 is etched to form the shapes of the beam part 26, the central weight part 12a and the support part 10 as shown in FIG. 1.

Figure 21:
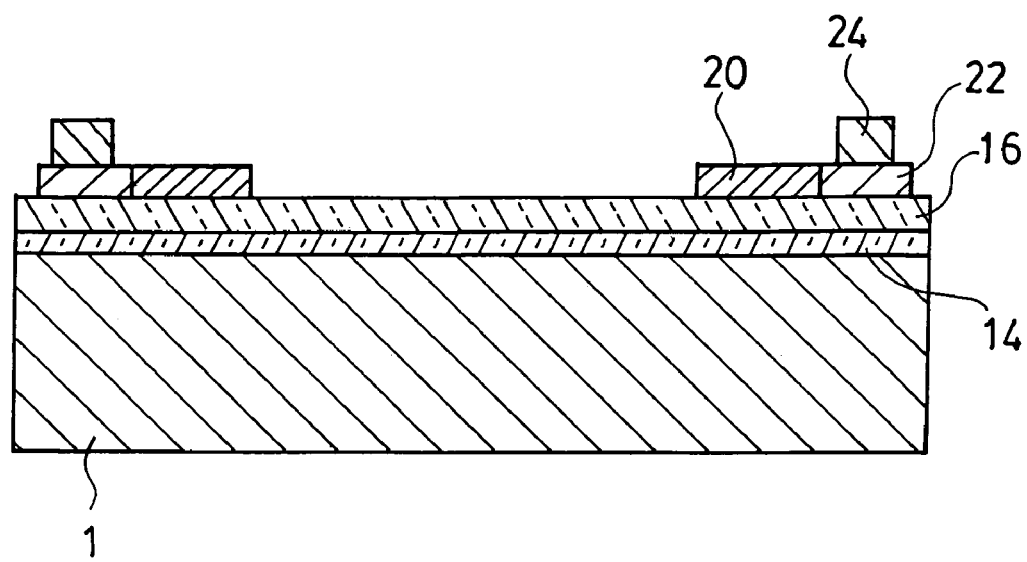

Next, in order to form the metal wires 24, an aluminum layer is formed on the upper portion of the silicon semiconductor substrate 1. As one example, the aluminum layer is formed with a thickness of 1.0 μm by sputtering, the wiring pattern is made by selectively leaving the photoresist not shown, and each of the metal wires 24 is formed as shown in FIG. 21 by dry etching.

Though not shown in the drawing, a pad region for connecting these metal wires 24 and the external circuit is also formed. Since the pad region is a metal, it can be formed simultaneously with the process step of forming the metal wires 24.

Naturally, the metal wires 24 shown in the drawing can also serve as the pad regions. By adopting such a construction, it becomes unnecessary to provide the pad regions specially.

Figure 22:
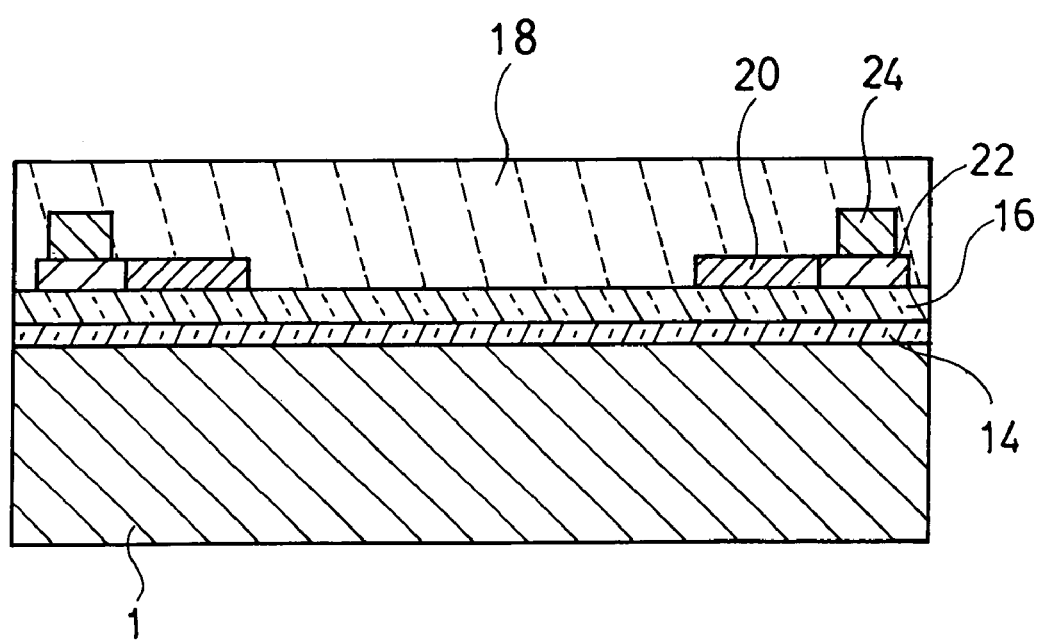

Next, as shown in FIG. 22, a resin film 18 is formed on the entire surface. In this example, the polyimide film of a thickness of 2.0 μm is formed.

Figure 23:
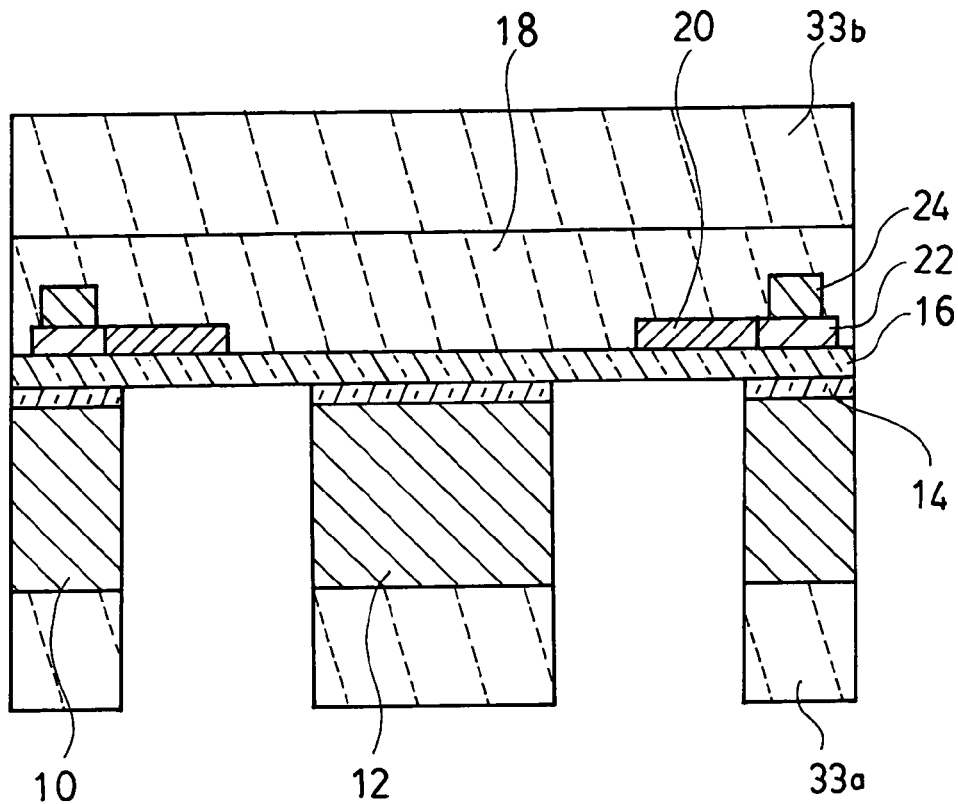

Thereafter, a mask composed of a photoresist or the like is formed on the back surface of the silicon semiconductor substrate 1 to make a pattern for forming the weight part 12, and the silicon semiconductor substrate 1 is etched into the shape of the weight part 12. For this purpose, first, as shown in FIG. 23, photoresists 33a and 33b that are the first masks are respectively formed on both of the upper side surface and the lower side surface of the silicon semiconductor substrate 1 by the first mask process step.

The photoresist 33b is used for top surface protection, and the photoresist 33a is used for etching the silicon semiconductor substrate 1 and the silicon oxide film 14 on the back surface.

In order to form the weight part 12, the photoresist 33a on the lower surface side of the silicon semiconductor substrate 1 is patterned into a desired shape.

Next, the silicon semiconductor substrate 1 is disposed in a dry etching device with the upper side surface protected with the photoresist 33b down, and by the dry etching method having anisotropy, the silicon semiconductor substrate 1 is etched to a predetermined distance (degree to reach the silicon oxide film 14) from the lower surface side. The dry etching method is a method for alternately performing etching and deposition by using $SF_6$ (sulfur hexafluoride) that is a well-known etching gas and $C_4F_8$ (octafluorocyclobutane) that is a deposition gas. This is a first etching process step.

Figure 24:
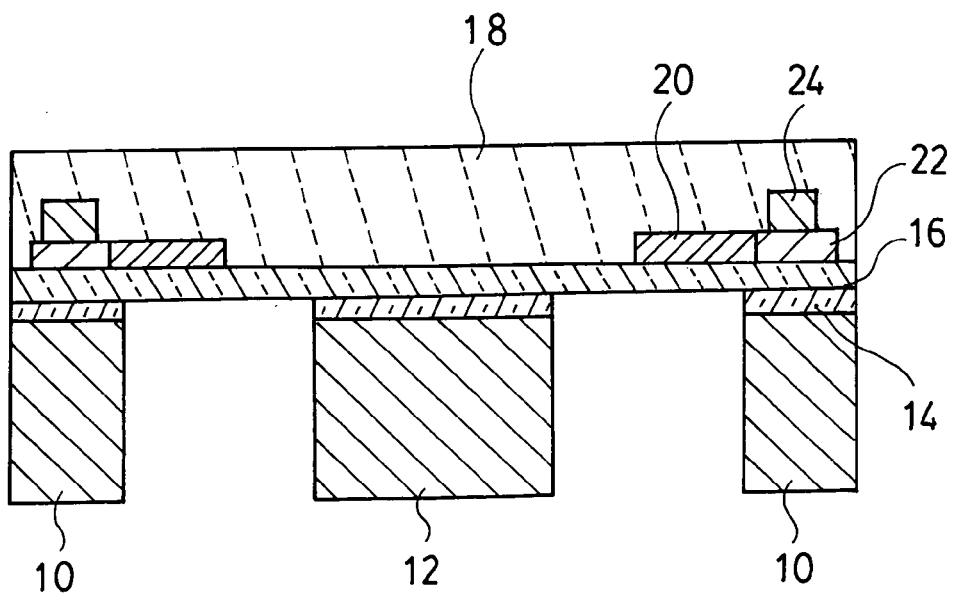

In the state of the photoresist 33a is left, the silicon oxide film 14 is removed by a wet etching method using hydrofluoride acid, and thereafter, the photoresists 33b and 33a on the front surface and the lower surface side are removed by a mask removing process step. By such a process step, the shape shown in FIG. 24 is obtained.

Figure 25:
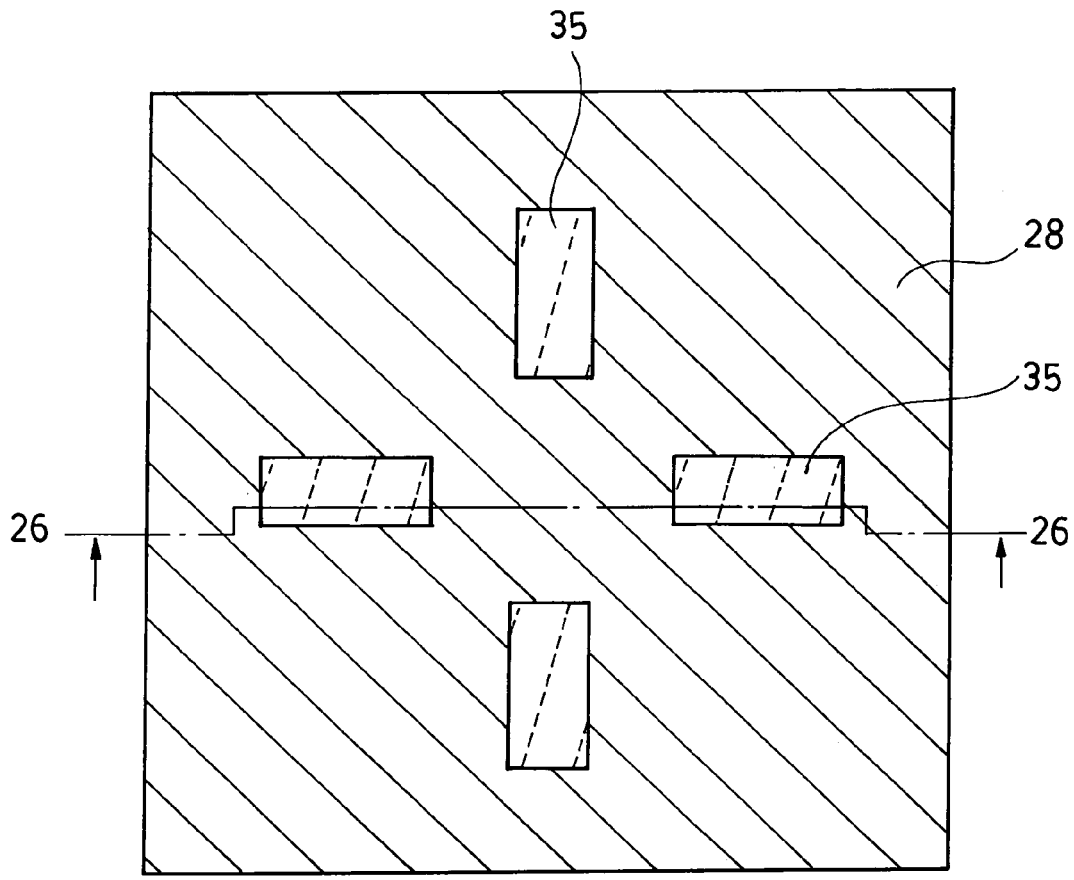
FIG. 25 is a plane view showing the fabrication process step following FIG. 24.
Figure 26:
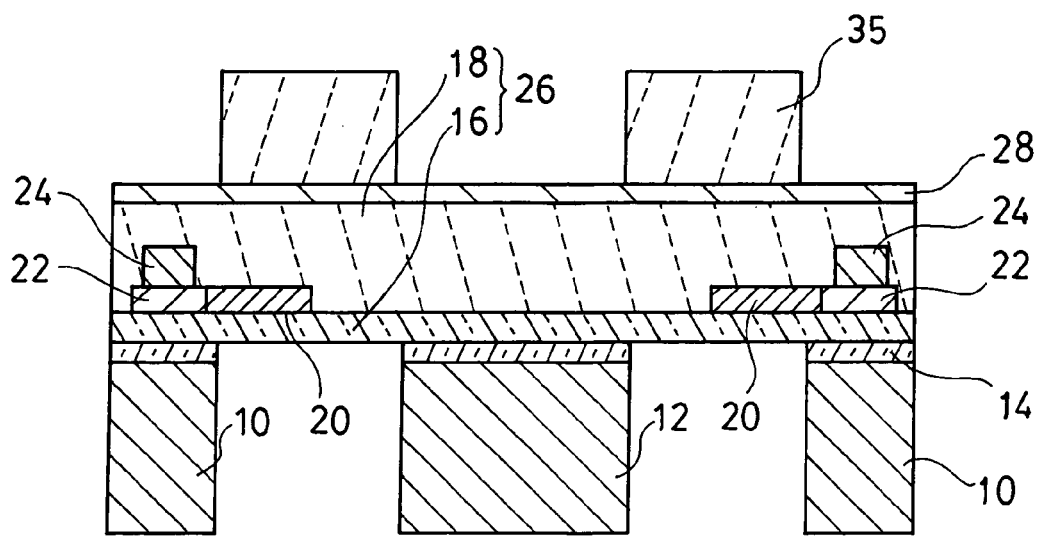
FIG. 26 is an end view of a section taken along the line 26-26 in FIG. 25.

FIGS. 25 and 26 are views for explaining a preparing process step for etching the resin film 18 into the shape of the beam part 26, FIG. 25 is a plane view, and FIG. 26 is an end view of a section taken along the line 26-26 of FIG. 25.

Namely, the plane view in which a silicon oxide film 28 is formed with a thickness of 0.5 μm on the entire surface of the front surface of the resin film 18 by the plasma CVD method, then by a second mask process step, a photoresist 35 that is a second mask is formed on the silicon oxide film 28, and patterning is performed to form the cross-shaped beam part 26 is FIG. 25.

Next, with the pattern of the photoresist 35 shown in FIGS. 25 and 26, etching of the silicon oxide film 28 is performed. For etching of the silicon oxide film 28, the mixture gas of $CF_4$ (carbon tetrafluoride), $CHF_3$ (trifluoromethane) and He (helium) is used.

Thereafter, the photoresist 35 may be removed by the mask removing process step. Even if the photoresist 35 that is the second mask is removed, the silicon oxide film 28 remains in the same shape as the pattern of the photoresist 35, and therefore, this can be used as the etching mask. Then, the polyimide film that is the resin film 18 is etched into the same shape as the silicon oxide film 28, and the beam part 26 is formed. For etching of the polyimide film, oxygen plasma is used. This is the second etching process step. Thereafter, the silicon oxide film 28 is removed by the dry etching method.

Further, though not shown in the drawing, the silicon oxide film 28 shown in FIG. 26 is left on the top portion of the beam part 26, and the beam part 26 may be formed by making the silicon oxide film 28, the silicon nitride film 16 and the resin film 18 as a stacked film.

By such a process step, the electromechanical transducer of the aforementioned first embodiment shown in FIGS. 2 to 4 can be fabricated.

Figure 27:
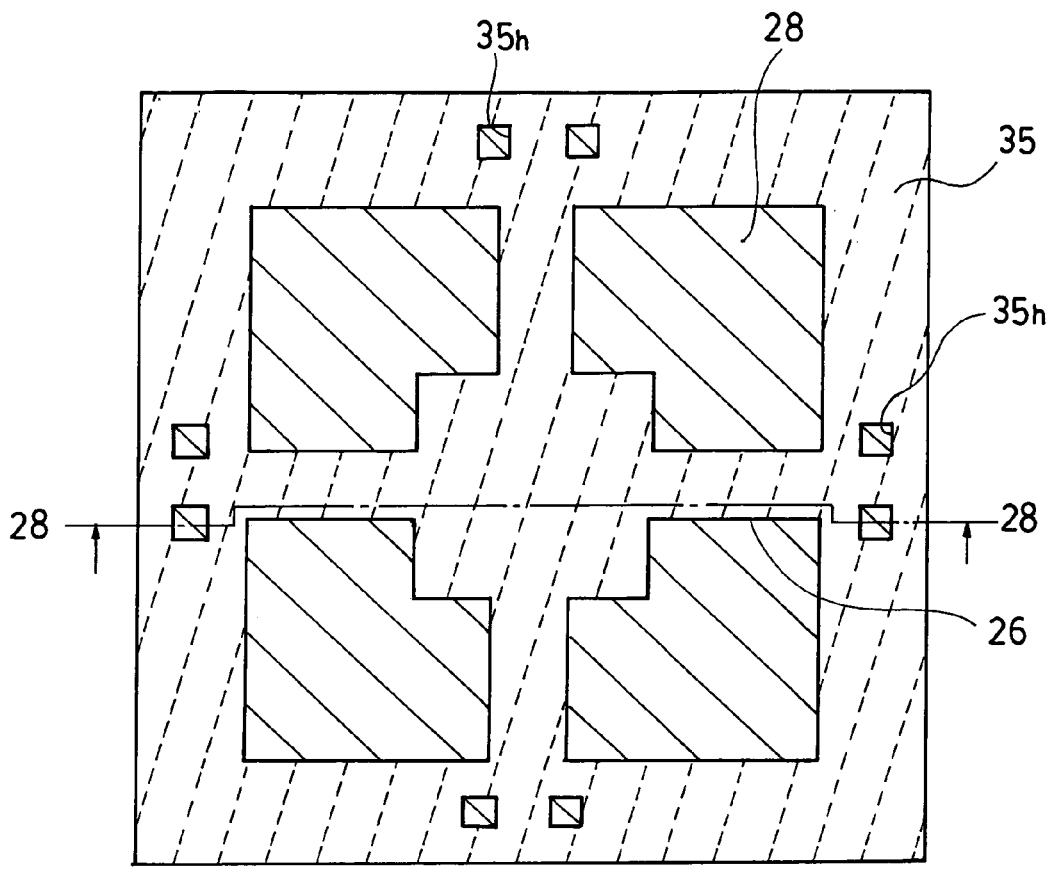
FIG. 27 is a plane view showing a fabrication process step replaced with FIG. 25.
Figure 28:
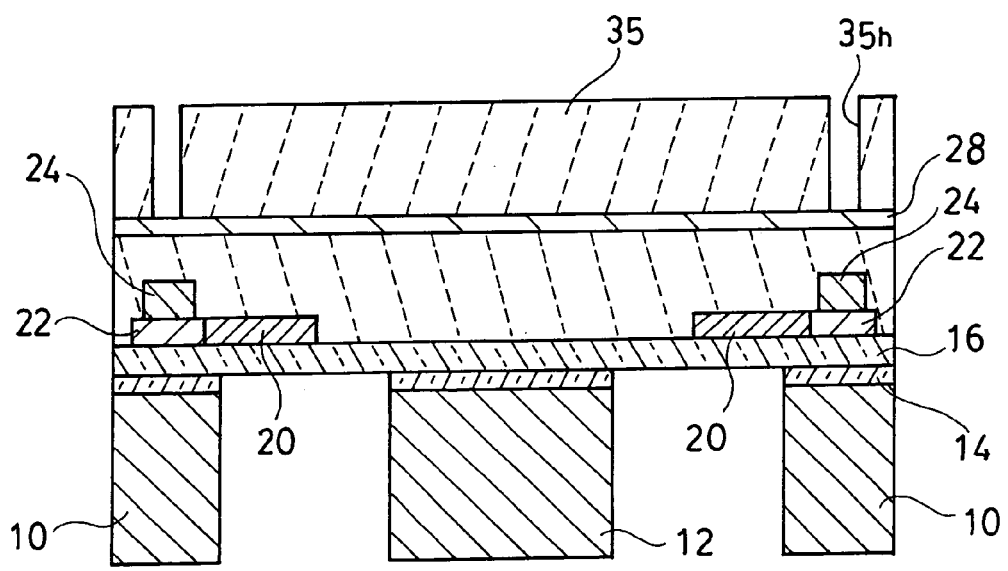
FIG. 28 is an end view of a section taken along the line 28-28 in FIG. 27.

When the electromechanical transducer in the aforementioned third embodiment shown in FIGS. 11 to 13 is manufactured, in place of the process steps shown in FIGS. 25 and 26, the photoresist 35 is patterned as shown in FIGS. 27 and 28 corresponding to them. The photoresist 35 is provided not only on the upper portion of the beam part 26, but also on the upper parts of the fixed section and the movable section.

Namely, the plane view in which the silicon oxide film 28 is formed with a thickness of 0.5 μm on the entire surface of the front surface of the resin film 18 by the plasma CVD method, the phtoresist 35 is formed on the silicon oxide film 28, patterning for forming the cross-shaped beam part 26, the square frame-shaped support part 10, and the square central weight part 12a in the central portion, and patterning for forming the opening portions 35h for pads of the metal wires 24 are performed is FIG. 27, and an end view of a section taken along the line 28-28 of FIG. 27 is FIG. 28.

With the pattern of the photoresist 35 shown in FIGS. 27 and 28, etching of the silicon oxide film 28 is performed as in the aforementioned case. Further, after the photoresist 35 is removed, the polyimide film that is the resin film 18 is etched into the same shape as the silicon oxide film 28 with the silicon oxide film 28 as the etching mask, and the resin film 18 is left on the upper portions of the beam part 26, the support part 10 and the central weight portion 12a. Oxygen plasma is used for etching of the polyimide film. Thereafter, the silicon oxide film 28 is removed by the dry etching method.

Further, the case where the upper lid is mounted by being bonded will be described. The resin film 18 has its bonding ability reduced too much to be used as an adhesive material after going thorough the fabrication process already described, and therefore, activation of its front surface is required. For activation of the front surface of the resin film 18, plasma processing is performed.

Figure 29:
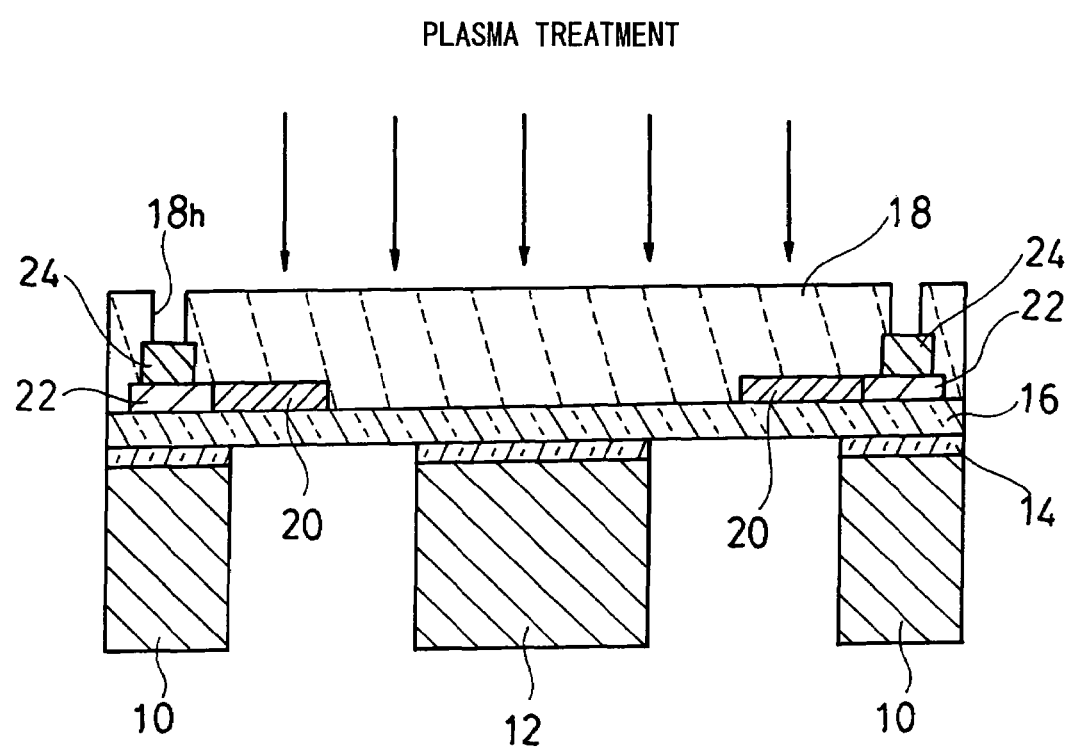
FIG. 29 is the similar end view as FIG. 24 showing a plasma treatment process step in the case of bonding the upper lid.

FIG. 29 shows the state in which the resin film 18 finishes being worked into a predetermined shape, and in this state, in a vacuum atmosphere, the entire front surface of the resin film 18 is subjected to plasma treatment. The gas used for the plasma treatment is not especially limited, but an H (hydrogen) gas, and an Ar (argon) gas are used.

Thereafter, in the vacuum atmosphere used for plasma treatment process step, the upper lid 60 shown FIGS. 14 and 15 is positioned to the frame-shaped support part 10 on the resin film 18, and heating and pressuring are performed to bond the upper lid 60.

In the above described method of fabricating the electromechanical transducer according to this invention, the explanation is made by using the silicon nitride film as the first insulating film, and by using the polyimide film as the resin film that is the second insulating film. Though the combination of the stacked films is not limited to this, but in consideration of the fabrication process and the physical property, controllability, and manageability required as the structure, this combination is preferable.

According to the method of fabricating the electromechanical transducer, by forming the beam part 26 by using two of the silicon nitride film 16 and the resin film 18 differing in characteristics, sufficient detecting sensitivity can be obtained even if the weight part is small.

Namely, the silicon nitride film 16 which is thin in the film thickness or large in the internal stress, and the resin film 18 which is thick in the film thickness or small in the internal stress are stacked, and the beam part 26 is formed by properly selecting the characteristic values of these two films, whereby, even when it is a compact structure with the small weight part 12, high sensitivity can be obtained.

By properly selecting the characteristics of the stacked film, it becomes possible to change the arrangement position of the piezoresistance element 20 in the thickness direction of the beam part 26. By changing the position in the thickness direction, optimal position at which stress is easily transmitted to the piezoresistance element 20 in the beam part 26 of the stacked film can be selected.

In the above described embodiments, the example in which the beam part 26 is constructed by stacking two films is shown, but the number of stacked films of the stack film is not limited to this, and three or more layers may be adopted. The important thing is that the overlaying films differ in its film thickness or stress characteristics, and the number of stacked films is not limited.

The electromechanical transducer and the method of fabricating the same according to this invention are usable in various sensors. For example, they are applicable to a pressure sensor, an acceleration sensor and the like. Further, they can contribute to reduction in cost of the fabrication process and reduction in size, and therefore, they are preferable for the sensors required to have high sensor sensitivity while required to be low in cost.

What is claimed is:

1. An electromechanical transducer comprising:
    a transducing element transducing a mechanical variation into an electrical variation;
    a weight part for applying a mechanical variation to the transducing element;
    a beam part in a slim piece shape that supports the weight part and is provided with the transducing element; and
    a frame-shaped support part supporting the beam part, wherein
        the weight part and the support part area formed of a silicon semiconductor substrate, the beam part is constructed by stacking a silicon nitride film and a resin film without the silicon semiconductor substrate, and the transducing element extends from a region above the frame-shaped support part into a portion between the silicon nitride film and the resin film of the beam part.

2. The electromechanical transducer according to claim 1, wherein
    the resin film constructing the beam part is provided to extend to an upper portion of the support part, and also serves as a protection film that protects the beam part and the support part.

3. The electromechanical transducer according to claim 2, wherein the resin film constructing the beam part also serves as bonding means of an upper lid that covers top surfaces of the beam part and the support part.

4. The electromechanical transducer according to claim 3, wherein the resin film is a polyimide film.

5. The electromechanical transducer according to claim 2, wherein the resin film is a polyimide film.

6. The electromechanical transducer according to claim 1, wherein the resin film is a polyimide film.

7. The electromechanical transducer according to claim 1, wherein the transducing element is a piezoresistance element.

8. The electromechanical transducer according to claim 7, wherein the piezoresistance element is composed of a polycrystalline silicon film in which an impurity is implanted.

9. The electromechanical transducer according to claim 8, wherein the piezoresistance element is formed into a turn-back shape in which it extends from two spots on a region of the support part, which supports the beam part, to the beam part in parallel and connected at tip end portions.

* * * * *